United States Patent [19]
Kilkki et al.

[11] Patent Number: 6,167,030
[45] Date of Patent: Dec. 26, 2000

[54] BUFFER-BASED TRAFFIC MEASUREMENT SYSTEM AND METHOD FOR NOMINAL BIT RATE (NBR) SERVICE

[75] Inventors: Matti Kalevi Kilkki, Espoo; Jussi Pekka Olavi Ruutu, Helsinki; Sari Irene Saranka, Espoo, all of Finland

[73] Assignee: Nokia Telecommunications, OY, Espoo, Finland

[21] Appl. No.: 08/821,363

[22] Filed: Mar. 20, 1997

[51] Int. Cl.[7] ............... H04J 1/16; H04J 12/28; H04J 3/16; H04D 7/212
[52] U.S. Cl. ............ 370/236; 370/412; 370/468
[58] Field of Search .................... 370/229, 230, 370/231, 232, 233, 234, 236, 235, 239, 412, 395, 397, 391, 400, 444, 410, 455, 465, 468

[56] References Cited

U.S. PATENT DOCUMENTS

| | | | |
|---|---|---|---|
| 5,042,029 | 8/1991 | Hayakawa | 370/231 |
| 5,313,454 | 5/1994 | Bustini et al. | |
| 5,319,638 | 6/1994 | Lin | 370/235 |
| 5,359,593 | 10/1994 | Derby et al. | 370/234 |
| 5,434,848 | 7/1995 | Chimento, Jr. et al. | |
| 5,455,820 | 10/1995 | Yamada | 370/395 |
| 5,515,359 | 5/1996 | Zheng | 370/232 |
| 5,546,389 | 8/1996 | Wippenbeck et al. | 370/412 |
| 5,594,729 | 1/1997 | Kanakia et al. | 370/391 |
| 5,701,291 | 12/1997 | Roberts | 370/232 |
| 5,838,663 | 11/1998 | Elwalid et al. | |
| 5,909,443 | 6/1999 | Fichou et al. | |

FOREIGN PATENT DOCUMENTS 0 743 803 A2  11/1996  European Pat. Off. .
0 805 578 A2  11/1997  European Pat. Off. .

OTHER PUBLICATIONS

Technical Committee, Traffic Management Specification Version 4.0, af–tm–00561.000, Apr. 1996, pp. 1–59.

Integrated Services Digital Network (ISDN) Overall Network Aspects and Functions, Traffic Control and Congestion Control in B–ISDN, ITU–T Recommendation 1.371, Mar. 1993, pp. 1–27.

What are the meaning of CBR, VBR, ABR, UBR?, Maintained by Carl Symborski, Last Changed Aug. 20, 1996, pp. 1–2 and 1–5.

ATM Service Categories: The Benefits to the User, Editor: Libio Lambaarelli, CSELT' Torino, Italy, pp. 1–10.

An Overview of ATM Technology, Gary Kessler, Jan. 1995, pp. 1–10.

ATM—The New Technology for Tommorow's B–ISDN, Engui Yao, Dec. 1994, pp. 1–23.

*Primary Examiner*—Chau Nguyen
*Assistant Examiner*—Chiho Andrew Lee
*Attorney, Agent, or Firm*—Altera Law Group LLC

[57] ABSTRACT

A system and method for controlling the cell priority of cells transmitted from a cell source to network destinations across a network connection is provided. Each of the cells transmitted is registered in a measurement buffer upon being output from the cell source. The registered cells in the measurement buffer are discharged at a discharge rate corresponding to the current occupancy level of the measurement buffer. Cell priority values are generated by correlating the current buffer occupancy level to one of a plurality of predetermined buffer occupancy ranges to determine which occupancy range coincides with the current occupancy level. The generated cell priority values are loaded into cells transmitted from the cell source for use by the network connection.

40 Claims, 18 Drawing Sheets

BUFFER-BASED TRAFFIC MEASUREMENT SYSTEM AND METHOD FOR NOMINAL BIT RATE (NBR) SERVICE

FIELD OF THE INVENTION

The present invention relates generally to communications systems, and more particularly, to a buffer-based system and method for measuring cell transmission rates and assigning cell priorities to cells sent through a network employing a nominal bit rate (NBR) service.

BACKGROUND OF THE INVENTION

The state of communications technology, particularly that which affects the Internet, is currently in flux and subject to rapid and often uncoordinated growth. The ubiquity and variety of personal computers and set-top boxes has placed significant pressure on the providers of communications system infrastructure to accommodate the alarming increase in the number of new users that demand immediate access to Internet and other network resources. The rapid development of new and sophisticated software made available to users of such services places additional demands on system infrastructure.

Conducting commerce over the Internet and other networks is a practice that is gaining acceptance and popularity. By way of example, traditional on-line services, such as those offered by Internet providers, typical charge customers a monthly fee for access to basic services and resources, such as proprietary and public databases of information. Such traditional service providers also advertise any number of products or services which are purchasable on-line by the user.

Other forms of Internet commercialization currently being considered or implemented include offering of video and audio conferencing services, and a variety of other real-time and non-real-time services. The providers of these services, as well as the providers of communications system infrastructure, are currently facing a number of complex issues, including management of network capacity, load, and traffic to support real-time, non-real-time, and high-bandwidth services, and implementing a viable billing scheme that accounts for the use of such services.

The communications industry is expending considerable attention and investment on one particular technology, referred to as asynchronous transfer mode (ATM), as a possible solution to current and anticipated infrastructure limitations. Those skilled in the art understand ATM to constitute a communications networking concept that, in theory, addresses many of the aforementioned concerns, such as by providing a capability to manage increases in network load, supporting both real-time and non-real-time applications, and offering, in certain circumstances, a guaranteed level of service quality.

A conventional ATM service architecture typically provides a number of predefined quality of service classes, often referred to as service categories. Each of the service categories includes a number of quality of service (QoS) parameters which define the nature of the respective service category. In other words, a specified service category provides performance to an ATM virtual connection (VCC or VPC) in a manner specified by a subset of the ATM performance parameters. The service categories defined in the ATM Forum specification referenced hereinbelow include, for example, a constant bit rate (CBR) category, a real-time variable bit rate (rt-VBR) category, a non-real-time variable bit rate (nrt-VBR) category, an unspecified bit rate (UBR) category, and an available bit rate (ABR) category.

The constant bit rate service class is intended to support real-time applications that require a fixed quantity of bandwidth during the existence of the connection. A particular quality of service is negotiated to provide the CBR service, where the QoS parameters include characterization of the peak cell rate (PCR), the cell loss rate (CLR), the cell transfer delay (CTD), and the cell delay variation (CDV). Conventional ATM traffic management schemes guarantee that the user-contracted QoS is maintained in order to support, for example, real-time applications, such as circuit emulation and voice/video applications, which require tightly constrained delay variations.

The non-real-time VBR service class is intended to support non-real-time applications, where the resulting network traffic can be characterized as having frequent data bursts. Similarly, the real-time variable bit rate service category may be used to support "bursty" network traffic conditions. The rt-VBR service category differs from the nrt-VBR service category in that the former is intended to support real-time applications, such as voice and video applications. Both the real-time and non-real-time VBR service categories are characterized in terms of a peak cell rate (PCR), a sustainable cell rate (SCR), and a maximum burst size (MBS).

The unspecified bit rate (UBR) service category is often regarded as a "best effort service," in that it does not specify traffic-related service guarantees. As such, the UBR service category is intended to support non-real-time applications, including traditional computer communications applications such as file transfers and e-mail.

The available bit rate (ABR) service category provides for the allocation of available bandwidth to users by controlling the rate of traffic through use of a feedback mechanism. The feedback mechanism permits cell transmission rates to be varied in an effort to control or avoid traffic congestion, and to more effectively utilize available bandwidth. A resource management (RM) cell precedes the transmission of data cells, which is transmitted from source to destination and back to the source, in order to provide traffic information to the source.

Although the current ATM service architecture described above would appear to provide, at least at a conceptual level, viable solutions to the many problems facing the communications industry, ATM, as currently defined, requires implementation of a complex traffic management scheme in order meet the objectives articulated in the various ATM specifications and recommendations currently being considered. In order to effectively manage traffic flow in a network, conventional ATM traffic management schemes must assess a prodigious number of traffic condition indicators, including service class parameters, traffic parameters, quality of service parameters and the like. A non-exhaustive listing of such parameters and other ATM traffic management considerations is provided in ITU-T Recommendation I.371, entitled Traffic Control and Congestion Control in B-ISDN, and in Traffic Management Specification, version 4.0 (af-tm-0056.000, April 1996), published by the Technical Committee of the ATM Forum.

One traffic parameter utilized in conventional traffic management schemes includes the rate at which cells are transmitted by the user. Conventional ATM traffic management principles provide for cell transmission rate adjustments based on feedback control information received from the network. This additional complexity may be undesirable, as it may be faster and more efficient to perform these operations at the user/network interface (UNI). Furthermore, these conventional measurement principles provide feedback information periodically rather than continually providing cell rate information at the UNI. The conventional traffic management schemes also fail to provide measurement techniques for multiple cell priority values as is utilized in connection with the nominal bit rate service.

Accordingly, there is a need in the communications industry for a network arrangement and method that provides for a traffic management system and method which is conceptually uncomplicated to implement. A further need exists for a system and methodology that provides a buffer-based cell traffic measurement principle at the UNI, which allows cell rate information to be continuously available to the user rather than only providing information periodically, and which further avoids the complexity of cell feedback techniques. A system and methodology for assigning multiple priority levels, rather than a general on/off priority designation, is also desirable for use in connection with a nominal bit rate service as described herein. The present invention fulfills these and other needs, and offers other advantages over the prior art traffic management approaches.

SUMMARY OF THE INVENTION

The present invention is directed to a system and method for controlling the priority assigned to information elements transmitted across a network connection. A buffering scheme is employed to measure the transmission rate of information elements, such as cells, and to assign one of a sequential collection of cell priorities to cells transmitted from a cell source. The cells, each loaded with one of the cell priorities, are transmitted via a network connection having a quality of service based on a nominal bit rate (NBR). A nominal bit rate represents an expected, but not guaranteed, bit rate associated with a particular user or connection, and utilizes multiple cell priorities in managing cell traffic. The present invention provides a buffer-based system and method to support the cell traffic management in such a system.

In accordance with one embodiment of the invention, a method for controlling the cell priority of cells transmitted from a cell source to network destinations across a network connection is provided. Each of the cells transmitted is registered in a measurement buffer upon being output from the cell source. These registered cells in the measurement buffer are discharged at a discharge rate corresponding to the current occupancy level of the measurement buffer. Cell priority values are generated by correlating the current buffer occupancy level to one of a plurality of predetermined buffer occupancy ranges to determine which occupancy range coincides with the current occupancy level. The generated cell priority values are loaded into cells transmitted from the cell source.

In accordance with another embodiment of the invention, registering the cells in the measurement buffer includes providing a virtual cell in the measurement buffer for each of the cells transmitted from the cell source. In one embodiment this involves generating a duplicate cell for each of the cells transmitted from the cell source, and in another embodiment includes incrementing a buffer address pointer by one cell amount for each of the cells transmitted from the cell source. Cells are generally discharged at a rate regulated by providing one of a plurality of output enable signals to the output of the measurement buffer, where a different output enable signal is provided depending on which of the predetermined buffer occupancy ranges coincides with the current occupancy level.

The above summary of the present invention is not intended to describe each illustrated embodiment or implementation of the present invention. This is the purpose of the figures and the associated discussion which follows.

BRIEF DESCRIPTION OF THE DRAWINGS

Other aspects and advantages of the present invention will become apparent upon reading the following detailed description and upon reference to the drawings in which.

DETAILED DESCRIPTION OF THE ILLUSTRATED EMBODIMENTS

Figure 1:
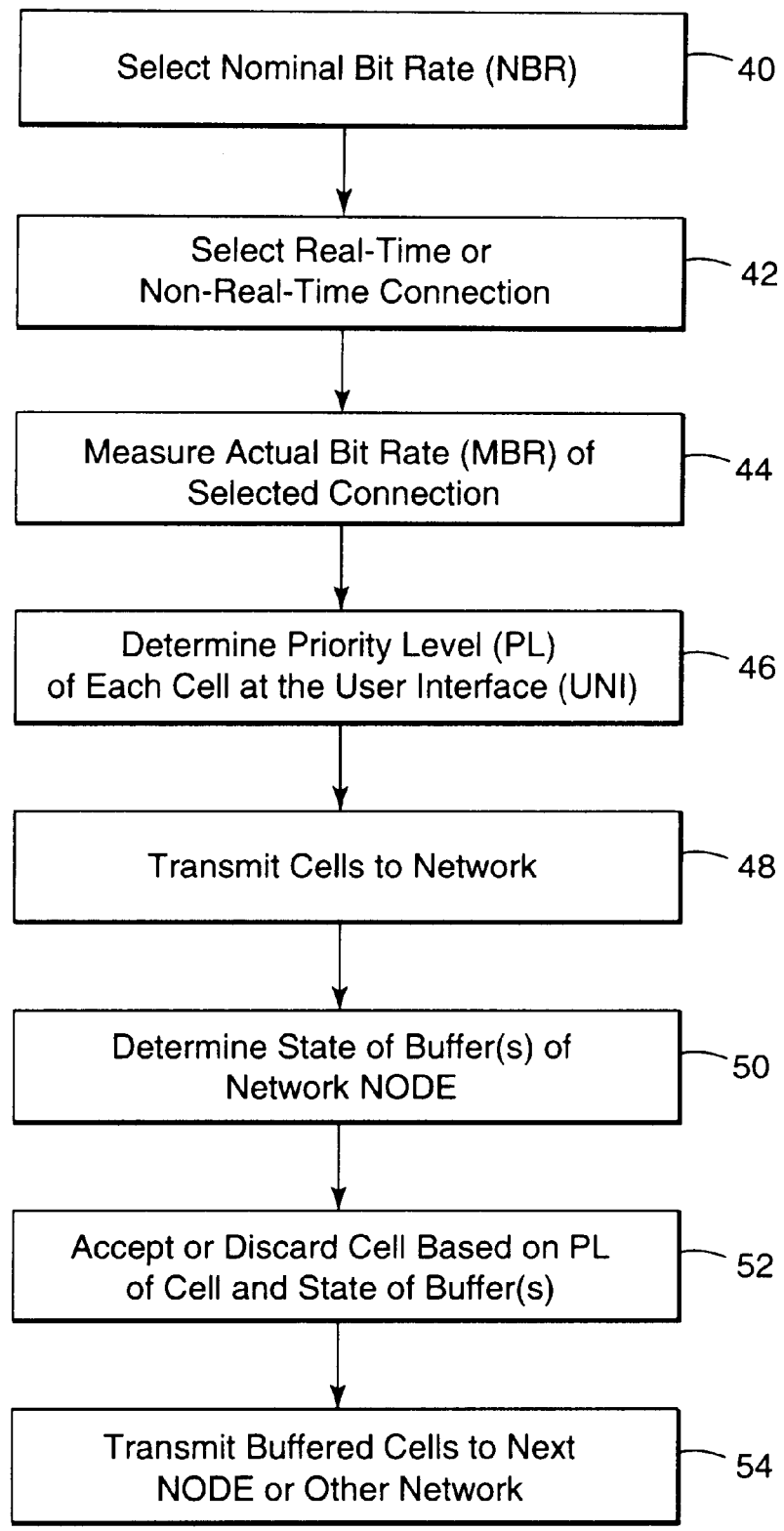
FIG. 1 is a flow diagram illustrating a general procedure for communicating cells of information between a user/network interface and a network using a nominal bit rate service in accordance with an embodiment of the present invention.

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

The service concept described herein may be viewed as a Simple Integrated Media Access (SIMA) service model. The SIMA service model incorporates the basic properties of ATM with the addition of eight priority levels as defined within the context of a new service concept termed a nominal bit rate service. In general, the NBR service provides for the simple and efficient division of network capacity amongst different connections and the charging of user fees for the use of such connections. A network that embraces a basic version of the SIMA service model does not need to perform many of the traditional and burdensome traffic management functions involving traffic descriptors, quality of service parameters, service classes, connection admission control (CAC), or usage parameter control (UPC).

All of these functions are effectively replaced by functions performed by two autonomous units: a measuring unit, provided at a user/network interface, and a cell scheduling and buffering unit, provided at a network node. The SIMA service concept, from a user's perspective, is simple and understandable, because there are no pre-defined traffic or quality parameters associated with each connection, and charging for connection usage is based solely on the value of NBR and the duration of the connection.

A typical implementation of a SIMA service utilizes two primary components: access nodes and core network nodes, which have fundamentally different functional responsibilities. For example, access nodes, which may be a user/network interface, perform the task of measuring traffic for every connection, whereas at the core network nodes, the traffic control functions do not need to know anything about the properties of individual connections.

The elegant simplicity of the SIMA service model offers obvious advantages to the manufacturers of infrastructure hardware and software. For example, ATM switches or crossconnects can be built using individual cell scheduling and buffering units, switching fabrics, and routing functions. By using ATM virtual paths or IP switching technology, the routing tasks may be reduced in complexity. In addition, packet discarding and priority feedback features may be included in the cell scheduling and buffering units without negatively impacting their automaticity. Also, simple implementation of network nodes may result in the availability of a relatively inexpensive, high capacity network infrastructure.

The more complex unit of the SIMA service infrastructure concerns the access nodes. Such access nodes will typically include a measuring unit to measure the traffic stream of every connection in real-time, and a computation unit for determining a priority to be assigned to every cell. These additional features should be implementable at a level of difficulty no greater than that for effecting UPC in conventional ATM networks.

The present invention provides a system and methodology for measuring the cell transmission rate from the user/network interface (UNI), and for assigning one of a plurality of priority levels, corresponding to a sequential collection of priority levels, to each of the cells output from the UNI. The system utilizes a buffer-based measuring concept wherein virtual cells corresponding to cells output from the cell output source are input into a buffer. The occupancy level of the buffer provides an indication of the cell transmission rate of an individual connection. The calculated cell transmission rate is compared to the NBR of the connection to determine how to manipulate cell priority values assigned to the cells.

The buffer is implemented such that the cell occupancy level of the buffer increases by one cell at each virtual cell arrival. Cells are discharged at a rate corresponding to the buffer occupancy level. The buffer is divided into multiple buffer occupancy ranges, each of which corresponds to a priority level to be assigned to cells output from the cell output source. Generally, where the buffer occupancy level is high, a high cell loss priority level is assigned to the cells, which indicates that they are more likely to be discarded at a network node. Analogously, a low buffer occupancy level indicates a lower cell transmission rate, and a greater likelihood of successful passage through the nodes on the network connection.

Referring now to FIG. 1, there is shown a general methodology for transmitting information between a user/network interface and a network over an NBR service connection. Initially, a user negotiates or selects 40 a nominal bit rate with the network operator, which may be performed prior to, or at the time of, establishing the connection. In one embodiment, the user informs the network operator that a desired NBR is required, and the requested connection bandwidth is allocated to the user. The network operator, in accordance with this embodiment, need not perform the task of analyzing current network load conditions existing at the core network nodes prior to establishing or releasing an NBR connection. In an alternative embodiment, the network operator performs the task of determining network load status prior to establishing or releasing an NBR connection, although this task may not be necessary in a properly dimensioned network supporting an NBR service.

Depending on a particular application, the user selects 42 a real-time or a non-real-time network connection. The process of determining the priority level (PL) of each cell, which indicates the importance or criticality of the cell relative to other cells, involves measuring 44 the actual or measured bit rate (MBR) of the selected real-time or non-real-time connection at the UNI. The priority level of each cell is determined 46 at the UNI. In one embodiment of the invention, a ratio of the MBR and the NBR is used to determine 46 the PL.

After computing the priority level of each cell at the UNI, the cells are transmitted 48 to the network, such as to a node of the network. A network node, upon arrival of a cell transmitted from the UNI, performs a cell filtering process by which the node determines whether to accept or discard a particular cell. The cell filtering process involves determining 50 the state of one or more buffers or memories of the network node to determine a buffer or memory occupancy level. The node accepts or discards 52 a cell based on the priority level of the cell and the state of the node buffer. Cells that meet the filtering criteria determined at the node are accepted, buffered, and eventually transmitted 54 to another node in the network or another network in a manner consistent with the expected quality of service for the connection.

Figure 2:
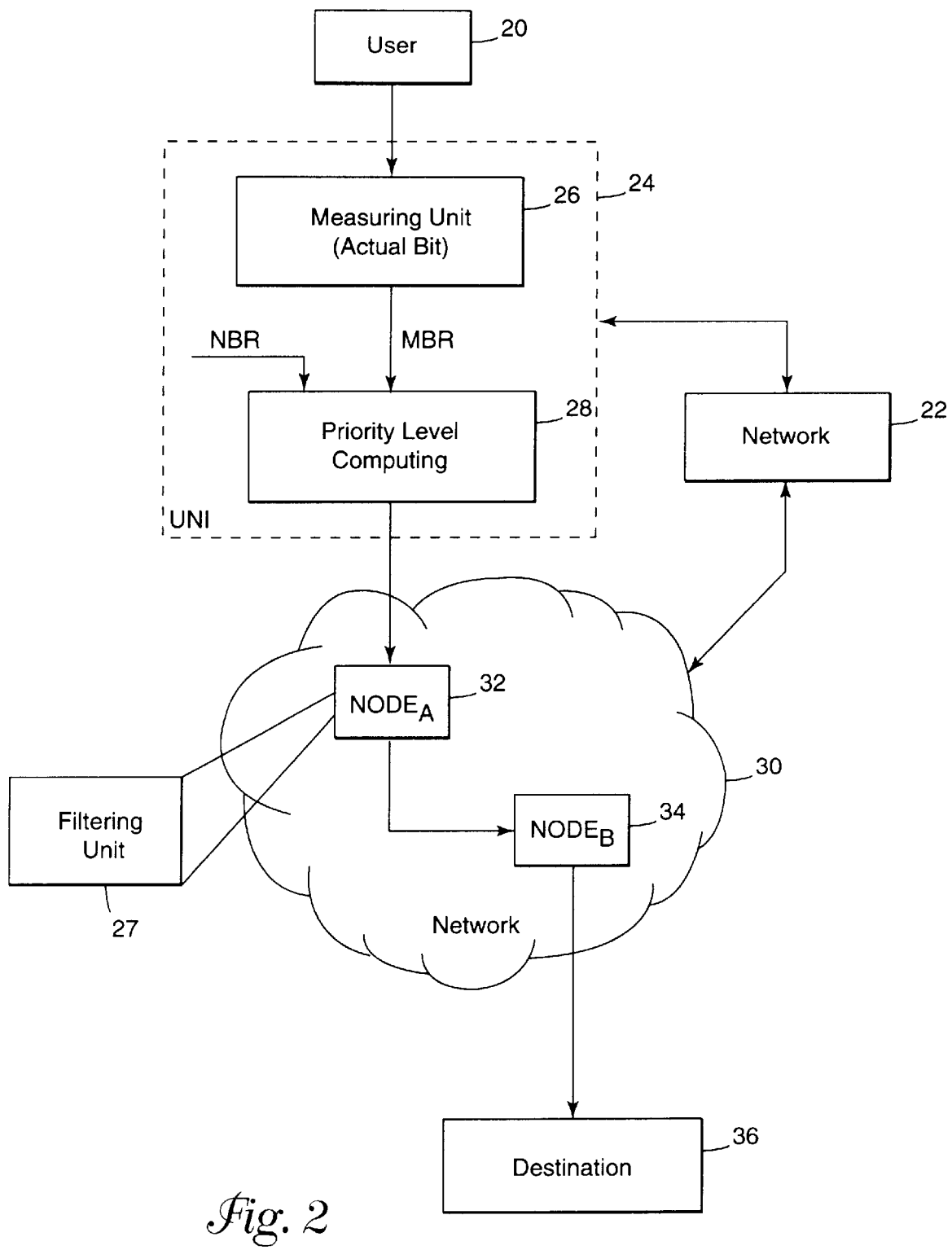
FIG. 2 is a system block diagram of a nominal bit rate service architecture in accordance with an embodiment of the present invention.

Concerning the embodiment illustrated in block diagram form in FIG. 2, there is shown a user 20 that employs a UNI 24 to communicate with a network 30. The user 20 negotiates a nominal bit rate with the network operator 22. The network operator 22 evaluates the user's NBR request based on a number of factors, including the NMR negotiated with other users 20, the number and nature of different connections associated with other users of the network, and other factors affecting network capacity and traffic flow. In principle, NBR can be zero, in which case all cells communicated through the UNI 24 are given lowest priority within the network 30. The value of NBR may also be greater than the transmission capacity at the UNI 24. If the value of NBR is significantly greater than the transmission capacity, for example, all cells transmitted from the UNI 24 are given highest priority within the network 30. It is noted that the priority level of a cell as defined herein has meaning within a network or a number of networks that embraces the NBR service concept. Cells that traverse beyond a network that offers an NBR service, such as by use of an network/network interface (NNI), may be processed in accordance with the traffic management strategy employed by such other network.

In contrast to conventional network services which are designed to provide a guaranteed quality of service, the network operator 22 does not guarantee the continuous availability of the user negotiated NBR. A properly dimensioned network, however, should provide adequate bandwidth to virtually ensure, although not guarantee, the availability of an established NBR. It is noted that all users who are transmitting data with an equivalent NBR encounter approximately the same quality of service.

Having established an NBR with the network operator 22, the user 20 is permitted to communicate information to a desired destination 36 via the network 30. A measuring unit 26 measures the actual or instantaneous bit rate (i.e., MBR) of each cell communicated between the UNI 24 and the network 30. Prior to departure of a cell from the UNI 24, a priority level computing unit 28 determines a priority level for the cell using the negotiated NBR and the MBR. In accordance with one embodiment, one of eight priority levels may be attributed to a given cell. The priority level computing unit 28 determines the priority level of a particular cell by computing a ratio of MBR to NBR. The priority level determined by the computing unit 28 is assigned to the cell which is then transmitted from the UNI 24 to the network 30.

The UNI 24 transmits the cell, which contains priority level information, to a node of the network 30, such as node$_A$ 32. The node$_A$ 32 accepts or discards the cell received from the UNI 24 based on the priority level of the cell and the buffering capacity of node$_A$ 32. In general, as the occupancy of the buffer or memory of node$_A$ 32 increases (i.e., becomes more filled), cells having a lower priority (i.e., higher priority level value) are discarded in favor of accepting cells having a higher priority (i.e., lower priority level value). As the occupancy level of the buffer of node$_A$ 32 decreases (i.e., becomes less filled), the node$_A$ 32 becomes increasingly tolerant toward accepting cells of lower priority (i.e., higher priority level values). Cells that are buffered in node$_A$ 32 are subsequently transmitted to another node in the network 30, such as node$_B$ 34, or other network and, ultimately, to an end-destination 36.

The exemplary network 30 used for purposes of this description is depicted as a network having two intermediary nodes 32 and 34. These nodes represent network data communications elements such as routers, switches and multiplexers. However, as will be appreciated by those skilled in the art, the present invention may likewise be implemented in various multi-node network structures such as multipoint, star, ring, loop and mesh network topologies used in networks ranging from local area networks (LAN) to proliferative global area networks (GAN) such as the Internet.

Figure 3:
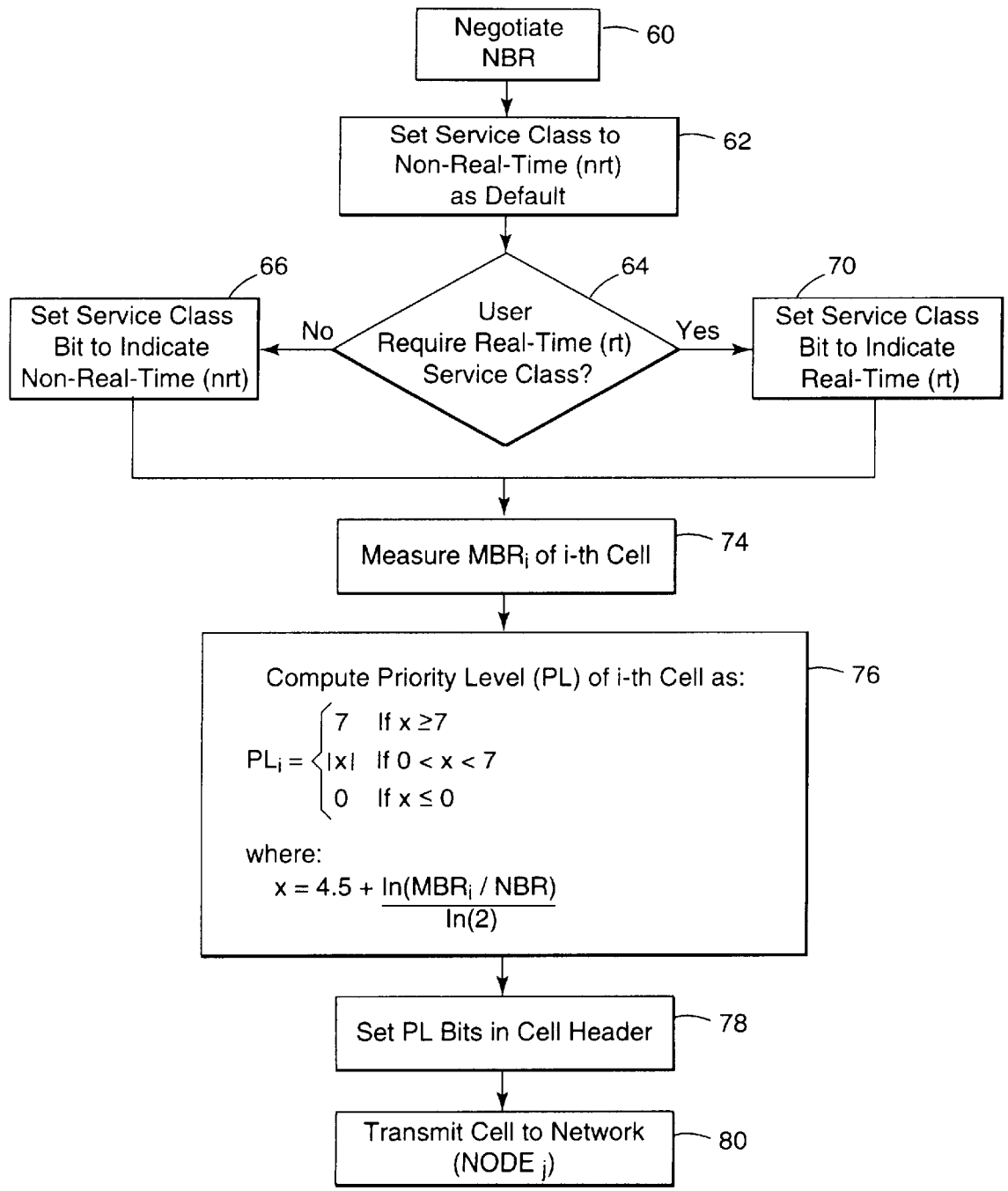
FIG. 3 illustrates in greater detail a procedure for transmitting cells of information between a user/network interface and a network using a nominal bit rate service in accordance with another embodiment of the present invention.
Figure 4:
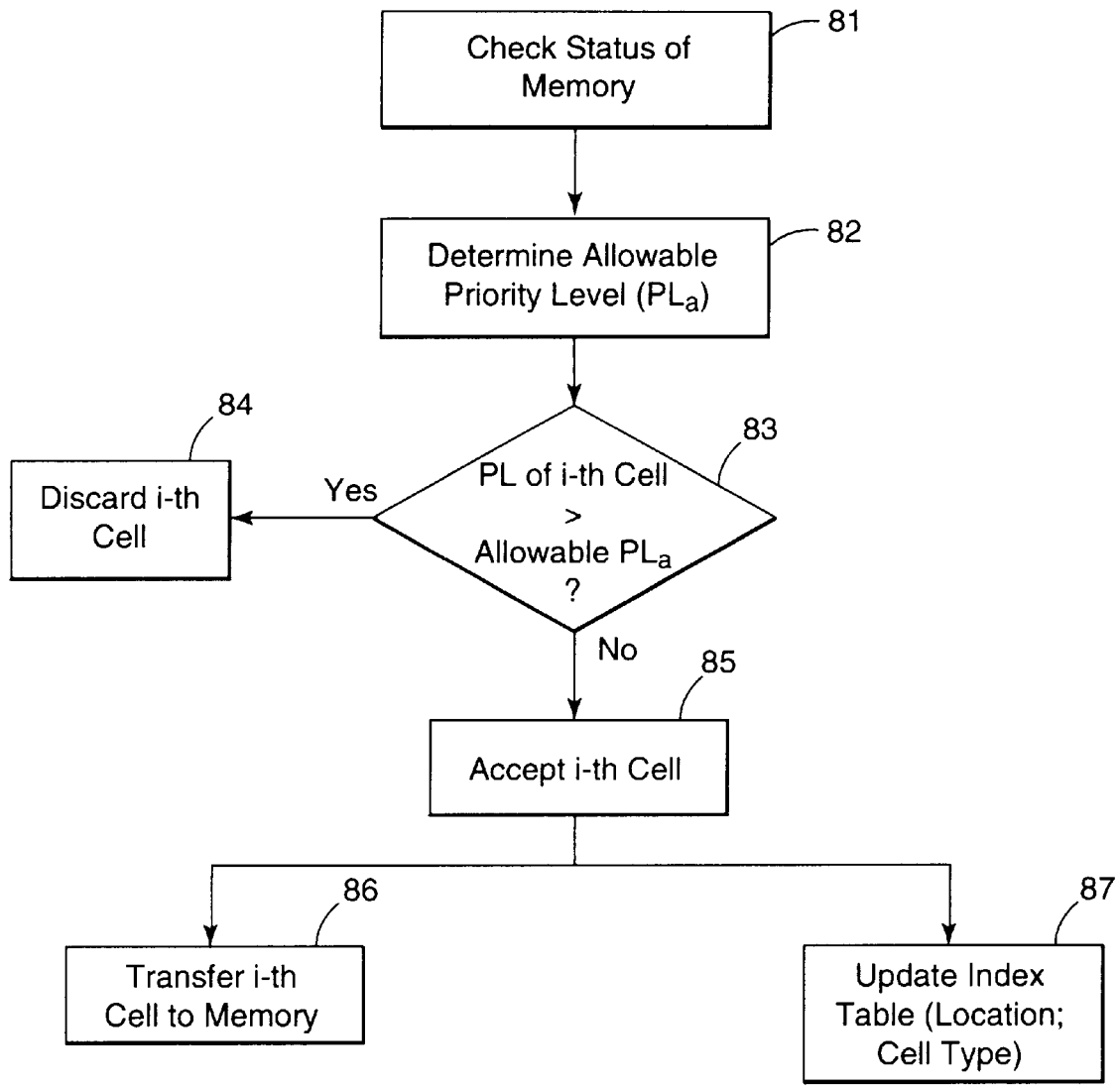
FIG. 4 illustrates in flow diagram form a general procedure for filtering cells at a network node in accordance with an embodiment of a nominal bit rate service.
Figure 5:
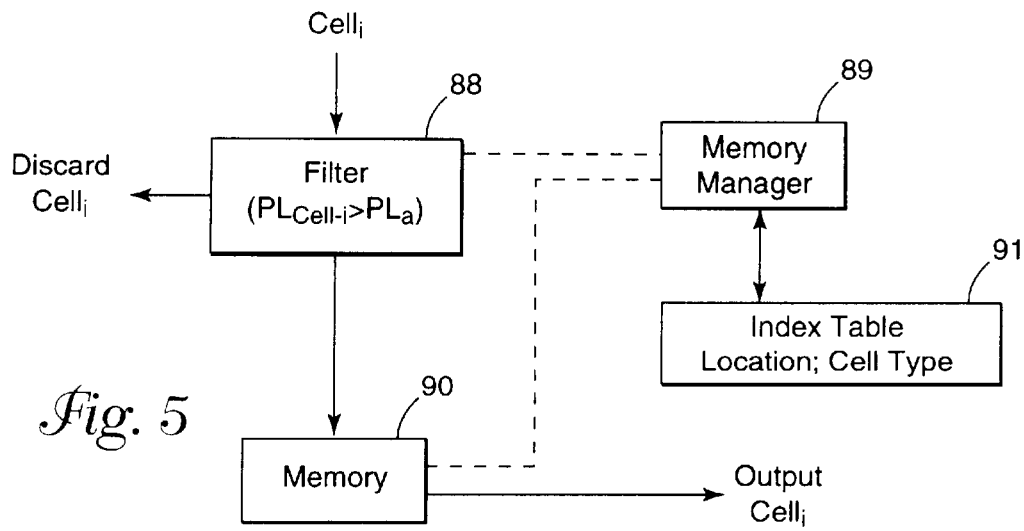
FIG. 5 is a block diagram of an embodiment of a system for filtering cells at a network node in accordance a nominal bit rate service.

FIGS. 3–5 illustrate a procedure for scheduling and buffering cells in accordance with one embodiment of an NBR service methodology. Referring now to FIG. 3, a user establishes 60 an NBR with a network operator. It may be desirable, although not required, to initially set the service class 62 to a non-real-time (nrt) service class as a default setting. Depending on a particular application, the user may require a real-time (rt) service class 64, which may be set by the user directly or, typically, by the user's application or communications software. If the user requires a real-time connection, each cell transmitted from the user's UNI will have the service class bit in the cell header set to indicate that the payload of the cell contains real-time information 70. It is noted that within the context of a network implemented in accordance with the NBR concept of the present invention, real-time service class connections are expected to support virtually any real-time application without the need to specify particular cell transfer delay (CTD) and cell delay variation (CDV) parameters. As such, the conventional procedure of setting CTD and CDV bits of the cell header to appropriate values to accommodate the real-time service requirements of the connection is altogether obviated.

If the user does not require a real-time service connection, the default non-real-time service class condition remains operative. As such, the rt/nrt service class bit of each cell header is set to indicate that the payload of the cell includes non-real-time information 66. It is noted that the NBR service disclosed herein does not utilize the cell loss priority (CLP) scheme used by conventional ATM traffic management approaches. As such, the CLP bit in the cell header may instead be used to discern between real-time and non-real-time payloads.

In the above described embodiment, each cell transmitted over a connection is designated as either a real-time cell or a non-real-time cell, such as by appropriately setting the rt/nrt service class bit of the cell header. In an alternative embodiment, depending on a user's requirements, a connection may be designated as being either a real-time or non-real-time connection, and the cells communicated over such a connection need not be individually assigned a real-time or non-real-time status. Each node for a given connection, for example, may perform a table look up procedure upon arrival of a cell at the node to determine whether the cell is associated with a real-time or a non-real-time connection. Thus, in accordance with this embodiment, a cell header bit need not be reserved for distinguishing between real-time and non-real-time cells.

After the rt/nrt service class header bit has been set in the above-described manner, the actual bit rate of a particular cell to be transmitted between the UNI and the network is measured 74. Since, in practice, the actual bit rate may be subject to significant variability over time, a measuring unit of the UNI employs an averaging measuring principle to determine the actual or instantaneous bit rate, $MBR_i$.

In general, the UNI measures 74 the actual bit rate of a cell, such as celli, by approximating the actual or instantaneous bit rate of the connection within a measuring period having a duration that is appropriate for the particular connection (e.g., a real-time or non-real-time connection). The present invention provides for the measurement of the instantaneous bit rate, $MBR_i$.

Having determined 74 the measured bit rate, $MBR_i$, of the i:th cell, the priority level of the i:th cell is computed using the measured bit rate, $MBR_i$, and the nominal bit rate, $NBR$. In accordance with one embodiment, it is assumed that a cell may be distinguished from other cells using a cell prioritization scheme that employs eight priority levels. In order to indicate which of the eight priority levels is attributed to a particular cell, each cell allocates three bits for this purpose.

In accordance with current ATM specifications, an ATM cell is specified as a unit of transmission having a fixed-size frame consisting of a 5-octet header and a 48-octet payload. It is appreciated that the necessity to allocate three bits in the cell header for the purpose of designating cell priority level may require utilization of currently defined ATM header bits. By way of example, it may be possible to utilize the current Generic Flow Control (GFC) field which constitutes a total of four bits. In this case, three bits may be allocated for designating cell priority level and one bit may be designated as the rt/nrt service class bit. It may be possible, in accordance with another embodiment, to allocate other header bits for the purpose of indicating one of eight priority levels and rt/nrt service class by deviating from the five-octet header ATM specification.

As such, other header bits may be redefined to represent cell priority level and service class designations. Alternatively, one or more bits required to specify cell priority level and/or service class may be situated outside of the currently defined ATM cell header. The need to make a minor modification to the existing ATM cell header definition is significantly offset by the substantial advantages offered by employing the NBR service scheme of the present invention, such as a significant reduction in network and traffic management overhead and complexity.

It is understood that the number of priority levels may be less than eight or greater than eight. By way of example, if it is assumed that four cell header bits are allocated for purposes of indicating a cell's priority level, as many as $2^4$ (i. e., $2^{n-bits}$) or 16 priority levels may be defined. Increasing the number of priority levels within the context of an NBR service permits the network operator to make finer adjustments to the bandwidth of a particular connection when managing network traffic. The price for this finer level of traffic control is the additional cell header bit or bits needed to resolve a greater number of priority levels.

A priority level computing unit determines 76 the priority level of each cell, such as celli. In accordance with one embodiment of the present invention, and assuming that the measured bit rate is $MBR_i$ when the i:th cell is transmitted to the network, the priority level ($PL_i$) of celli may be calculated using the following equation:

$$x = 4.5 + \frac{\ln(MBR_i / NBR)}{\ln(2)} \quad [1]$$

$$PL_i = \begin{cases} 7 & \text{if } x \geq 7 \\ \lfloor x \rfloor & \text{if } 0 < x < 7 \\ 0 & \text{if } x \leq 0, \end{cases}$$

where, $\lfloor x \rfloor$ represents the integer part of x. The present invention provides for the determination of cell priority levels ($PL_i$) using a buffer-based cell measurement and priority level assignment technique.

As will be discussed hereinbelow in accordance with an embodiment in which both NBR and traditional ATM service connections are accommodated, the zero priority level, PL=0, is reserved for those connections that use an ordinary ATM service with guaranteed bandwidth and quality of service. Accordingly, Equation [1] above may be modified so as to produce cell priority levels ranging between PL=1 and PL=7, such that $\lfloor x \rfloor$ represents the integer part of x, if 1<x<7.

It can be seen by application of Equation [1] above that if a connection is exploiting network capacity in excess to the connection's negotiated NBR value, the priority level of cell$_i$ is at least 4. It can further be seen that if the momentary bit rate at the UNI is less than the negotiated value of NBR, PL is at most 4. The priority level scheme in accordance with this embodiment of the present invention thus permits adjustment of the relative capacity used by a connection in steps of 2. From Equation [1] above, it can be seen that for an NBR of 100 kbit/s, an MER higher than 566 kbit/sec results in a PL of 7, and an MBR lower than 8.8 kbit/s results in a PL of 0.

The three priority level bits allocated in the cell header are set 78 for each ATM cell transferred from the UNI. The ATM cells are then transmitted 80 to targeted network nodes$_j$ identified by node addressing information provided in the cell header.

It is noted that if a user is not satisfied with the quality of service of the connection, the user may elect between at least three alternatives. First, the user may elect to keep the average bit rate unchanging, but reduce the variation of traffic process. Second, the user may elect to decrease the average bit rate, or to increase the nominal bit rate. Increasing the NBR will, however, generally result in a concomitant increase in cost for a higher speed connection. Finally, the user may change the network operator.

In FIG. 4, there is illustrated in flow diagram form a general methodology by which a network node processes cells containing priority level information received from a UNI in accordance with one embodiment of the present invention. FIG. 5 illustrates an embodiment of various components of a network node employed to effectuate the methodology illustrated in FIG. 4. It is assumed that a cell, such as celli, has been processed at a UNI and includes priority level information derived in a manner described hereinabove.

Cell$_i$ is transmitted from the UNI to a network node and is received at a filter 88 of the node. A memory manager 89 checks the status 81 of the memory 90 in order to determine the occupancy in the memory 90. The memory manager 89 determines 82 the allowable priority level ($PL_a$) based on the occupancy state of the memory 90. In general, the memory manager 89 establishes a high allowable priority which translates to a low allowable priority "level," for example $PL_a$=0 or 2, when the occupancy level of the memory 90 is high (i.e., few available memory locations). When the memory manager 89 determines that the memory 90 has ample capacity for receiving new cells, the memory manager 89 establishes a low allowable priority which translates to a high allowable priority "level," for example $PL_a=6$ or 7. As will be appreciated by those skilled in the art, the calculation of $PL_a$ could alternatively be based on unoccupied buffer capacity rather than on buffer occupancy without departing from the spirit of the invention.

If the priority level of $cell_i$ is greater than the allowable priority level, $PL_a$, as determined 83 by the memory manager 89, the filter 88 discards 84 $cell_i$. If, on the other hand, the priority level of $cell_i$ is equal to or less than the allowable priority level $PL_a$, the filter 88 accepts 85 $cell_i$. The memory manager 89 coordinates the transfer 86 of $cell_i$ to the memory 90 and updates an index table 91 coupled to the memory manager 89 to include a new index table entry for newly accepted $cell_i$. In one embodiment, the index table 91 stores the location of the accepted $cell_i$ in the memory 90, and also stores a cell-type indicator which specifies whether $cell_i$ is a real-time cell or a non-real-time cell. As such, the memory 90 may store both real-time and non-real-time cells.

The memory manager 89, in cooperation with the index table 91, manages cell transfer operations from the memory 90 to the output of the memory 90 by giving preference to the real-time cells over the non-real-time cells. By way of example, the memory manager 89, upon determining the presence of both rt-cells and nrt-cells stored in the memory 90, transfers all of the rt-cells to the output of the memory 90 prior to transferring out any of the nrt-cells.

Figure 6:
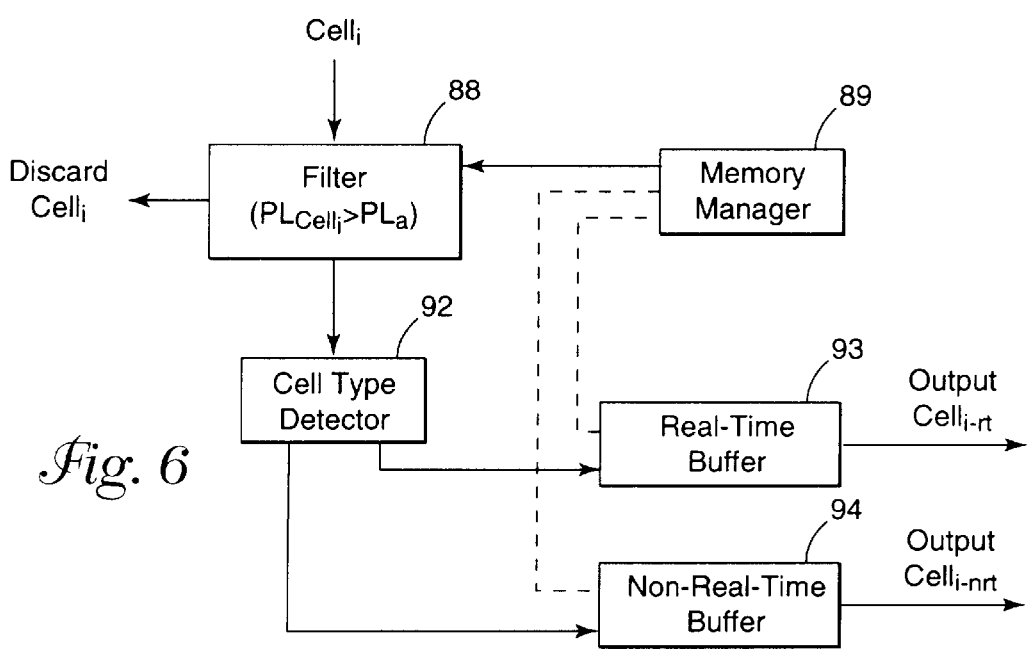
FIG. 6 is a block diagram of an alternative embodiment of a system for filtering cells at a network node in accordance with a nominal bit rate service.

In accordance with another embodiment, as is illustrated in FIG. 6, a memory manager 89 determines the status of a real-time buffer (rt-buffer) 93 and a non-real-time buffer (nrt-buffer) 94. The memory manager 89 determines, in a manner similar to that previously described, the allowable priority level, $PL_a$, for the filter 88 based on the status of the rt-buffer 93 and the nrt-buffer 94. If the priority level of $cell_i$ is greater than the allowable priority level, $PL_a$, the filter 88 discards $cell_i$. If, on the other hand, the priority level of $cell_i$ is equal to or less than the allowable priority level, $PL_a$, $cell_i$ is accepted.

In accordance with another embodiment, the network node may apply a buffer filtering scheme which performs the filtering function based on packets of cells, rather than on individual cells. By way of example, the filtering procedure described hereinabove may be applied to the first cell of each packet. If the first cell is discarded by the node, then all of the cells of the packet following the first cell are discarded as well. If, however, the first cell of a packet is accepted, then the priority of all other cells belonging to that packet may be increased, for example by changing the priority level from PL=5 to PL=3. A gain of even one priority level, such as from PL=4 to PL=3, is believed to be sufficient to ensure that there will only be very few partially transmitted packets.

A cell-type detector 92 receives the accepted cell, $cell_i$, from the filter 88 and determines whether $cell_i$ is an rt-cell or an nrt-cell. As discussed previously, the header of $cell_i$ includes a header bit, such as the CLP bit, which indicates whether or not $cell_i$ is an rt-cell or an nrt-cell. The cell-type detector 92, upon determining the service class type of the $cell_i$, transfers the $cell_i$ to either the rt-buffer 93 or the nrt-buffer 94. In a manner similar to that described previously with respect to FIGS. 4 and 5, the memory manager 89 coordinates the output of rt-cells and nrt-cells respectively from the rt-buffer 93 and the nrt-buffer 94, giving preference to the rt-cells.

In accordance with another embodiment of the present invention, it may be desirable, for purposes of enhancing network expansion and traffic control, to request that each user of the network purchase a maximum NBR. The maximum NBR value is intended to remain substantially constant. In addition, it may be desirable to request that each user select an appropriate instantaneous NBR, which should be no greater that the selected maximum NBR. The selection of an appropriate instantaneous NBR generally involves a compromise between price and quality of service. The service quality detected by a user depends largely on three parameters, namely the NBR, the average bit rate, and the amount of traffic variations. Although a user may change any of these parameters, the only information that the network needs to know at the initiation of cell transmission is the NBR and the service class (real-time or non-real-time) of the connection.

In accordance with another embodiment of the present invention, a SIMA service model provides for the accommodation of both NBR and traditional ATM service connections. It is appreciated that traditional ATM services which offer guaranteed connections may be desirable for certain applications. It is anticipated, however, that the quality of service offered by the NBR service of the present invention will meet or exceed a user's expectations for virtually all real-time and non-real-time applications.

A SIMA service which provides for both NER and traditional ATM services requires that the network operator dedicate a UPC device for each conventional ATM connection, or possibly for each virtual path. All of the cells transmitted using traditional ATM service connections are designated with the highest priority of PL=0 and with a real-time (rt) service class designation. In accordance with this approach, the zero priority level is reserved for those connections that use an ordinary ATM service with guaranteed bandwidth and quality of service. Accordingly, the priority determination Equation [1] above is modified so as to produce cell priority levels ranging between PL=1 and PL=7, such that $\lfloor x \rfloor$ represents the integer part of x, if 1<x<7. It is noted that if the network operator wants to mark excessive cells as CLP=1 cells, those cells may be marked with a lower priority, such as PL=6, for example.

A point of possible incompatibility with traditional ATM technology involves the necessity of three bits for each ATM cell for the determination of cell priority, or two bits if the current cell loss priority, CLP, bit in the cell header is used. In addition, one bit is needed to distinguish between real-time and non-real-time connections. The rt/nrt service bit may be, but is not required to be, included in every cell. It may be possible to utilize the current Generic Flow Control (GFC) field which constitutes a total of four bits. In this case, three bits may be allocated for designating cell priority level and one bit may be designated as the rt/nrt service class bit.

Figure 7:
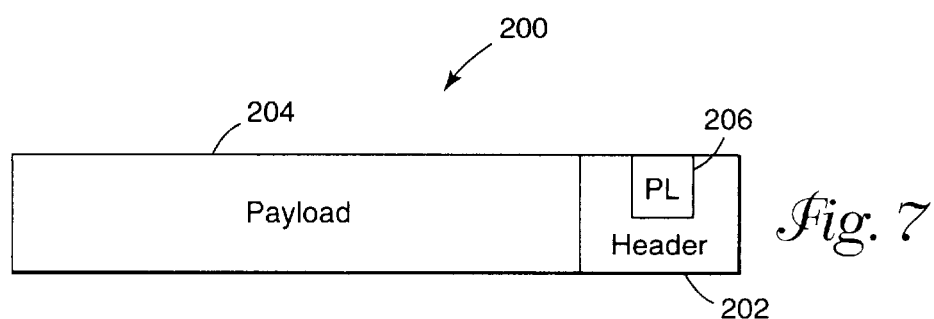
FIG. 7 illustrates one embodiment of a network cell in accordance with the NBR service of the present invention.

Referring now to FIG. 7, one embodiment of a network cell 200 in accordance with the present invention is shown. As previously described, ATM standards define an ATM cell as a fixed-size cell with a length of 53 octets comprised of a 5-octet header and a 48-octet payload. The cell 200 is modeled after the ATM standard cell, and includes a 5-octet header 202 and a 48-octet payload 204. Priority levels are calculated, and a priority level is assigned to each cell prior to being transmitted from a UNI to the network. Designation of the priority level attributed to a particular cell is stored in the priority level field (PL) 206. In the present example, eight priority levels are available, thereby necessitating the allocation of three bits in the PL field 206.

Figure 8:
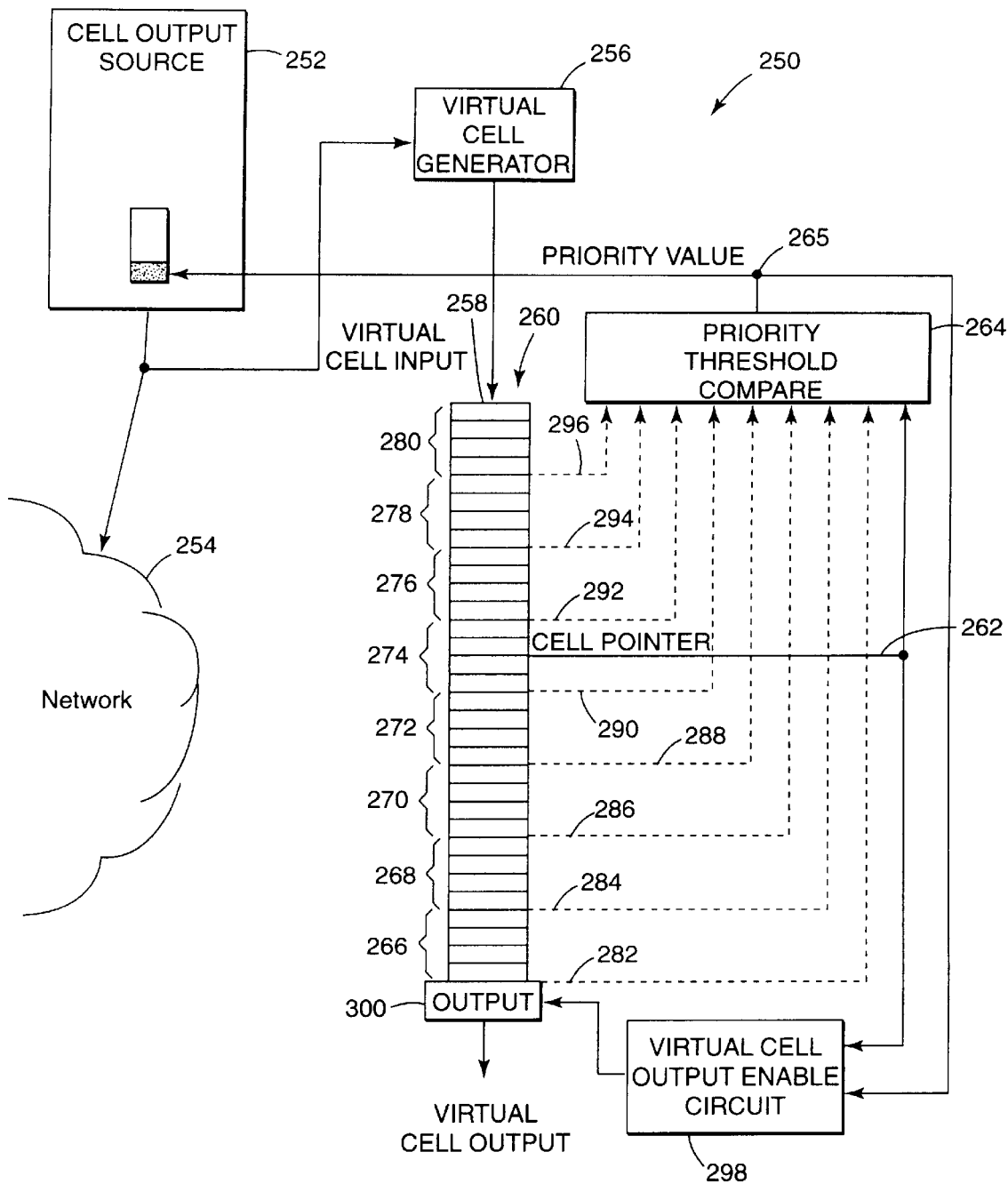
FIG. 8 is a block diagram illustrating a cell traffic measurement and priority assignment system in accordance with one embodiment of the present invention.

FIG. 8 is a block diagram illustrating a cell traffic measurement and priority assignment system 250 in accordance with one embodiment of the present invention. The system 250 monitors the cell transmission rate from the UNI on a particular connection, and assigns a priority level designation to each outgoing cell. The priority level assigned to a particular cell depends on the current cell transmission rate as compared to the established NBR. In one embodiment of the invention, eight priority levels exist, and a priority level value indicative of one of the eight priority levels is assigned to each of the cells transferred by a user from the UNI. Assuming eight priority levels, priority level values are assigned in one embodiment such that doubling the cell transfer rate causes the priority level (PL) to be incremented, where a PL of four corresponds to the negotiated nominal bit rate. This is illustrated in Table 1 below:

TABLE 1

| PL   | 7     | 6     | 5     | 4   | 3     | 2     | 1     | 0      |
|------|-------|-------|-------|-----|-------|-------|-------|--------|
| Rate | 8*NBR | 4*NBR | 2*NBR | NBR | NBR/2 | NBR/4 | NBR/8 | NBR/16 |

The cell output source 252 of FIG. 8 is responsible for sending information destined for a particular network node or destination by way of the network 254. As cells are output from the cell output source 252, the virtual cell generator 256 recognizes each of the cells transmitted to the network 254, and generates a stream of corresponding virtual cells at the virtual cell input 258 of the buffer 260. Therefore, the buffer 260 is filled with virtual cells as cells are output from the cell output source 252. The current occupancy level of the buffer 260 is indicated by an address which points to the next available buffer location, illustrated as the virtual cell pointer on line 262.

The traffic measurement and priority assignment system 250 is based on the virtual cell buffer 260. The occupancy level of the buffer 260 identifies the priority level which is to be assigned to cells output from the cell output source 252. A high buffer 260 occupancy level generally indicates that the cell output source 252 has been sending cells at a higher rate than the NBR, which results in higher priority level assignments. For example, referring to Table 1, where the traffic measurement and priority assignment system 250 determines that the cell output source 252 is sending cells to the network 254 at a rate twice that of the negotiated NBR (i.e., 2* NBR), the priority level will be increased to a PL equal to "5".

The buffer 260 occupancy level increases by one upon the arrival at the virtual cell input 258 of each cell from the virtual cell generator 256. The buffer 260 is emptied at a rate corresponding to its current occupancy level. In one embodiment of the invention, the cell discharge rate of the buffer 260 is set to approximately the same rate at which the cells arrive at the virtual cell input. In this case, the buffer occupancy level remains at the same level as long as the transmission rate at the cell output source 252 does not change. New cells output from the cell output source 252 would be assigned a common priority level based on the unchanging buffer occupancy level.

However, where the cell transfer rate from the cell output source 252 changes such that the buffer 260 begins to fill at a different rate, one of a plurality of buffer occupancy thresholds may be crossed. This is detected by the priority threshold compare unit 264, which determines whether, and which, priority threshold has been crossed according to the buffer occupancy level identified by the cell pointer 262. Where eight priority levels are used, the buffer is divided into eight different occupancy levels, labeled occupancy levels 266, 268, 270, 272, 274, 276, 278 and 280. The occupancy level divisions each correspond to a different priority level. For example, where buffer 260 is filled such that the cell pointer 262 is in the range of occupancy level 268, a priority level value of 1 is presented at the output of the priority threshold compare unit 264, which is entered into the PL field 206 of the cells.

The occupancy levels 266–280 are separated by buffer occupancy thresholds, represented by dashed lines 282, 284, 286, 288, 290, 292, 294 and 296. Each of these predetermined occupancy thresholds are compared to the current occupancy level designated by the cell pointer 262 at the priority threshold compare unit 264 to determine to what priority level subsequently transmitted cells should be set. For example, where the buffer occupancy level has increased into occupancy level 274, the priority threshold compare unit 264 recognizes that the threshold represented on line 290 has been surpassed, and that a priority value of "4" should be output to the cell output source 252.

The number of virtual cell locations in each of the buffer occupancy levels defines the overall rate of change of adjustment of the priority levels. For example, the larger the range of cells in each occupancy level, the slower the priority level adjustment. The number of buffer locations within the buffer occupancy levels can vary from level to level, as will be described in further detail below.

In order to maintain a buffer occupancy level in the buffer 260, the virtual cell output enable circuit 298 inputs the priority value from the priority threshold compare unit 264, and adjusts the rate at which the buffer 260 discharges the virtual cells at the virtual cell output 300. In one embodiment of the invention, each of the eight priority levels output from the priority threshold compare unit 264 are generally decoded at the cell output enable circuit 298 to provide eight cell transfer rates at the output 300 of buffer 260. For example, the cell output enable circuit 298 can generate one of eight pulse trains, each pulse train having a different frequency which controls the rate at which virtual cells are output from the buffer 260. In another embodiment, the cell pointer value is provided to the cell output enable circuit 298 such that the cell output enable circuit 298 can provide a signal to the output 300 based on the value of the cell pointer value 262.

Figure 9:
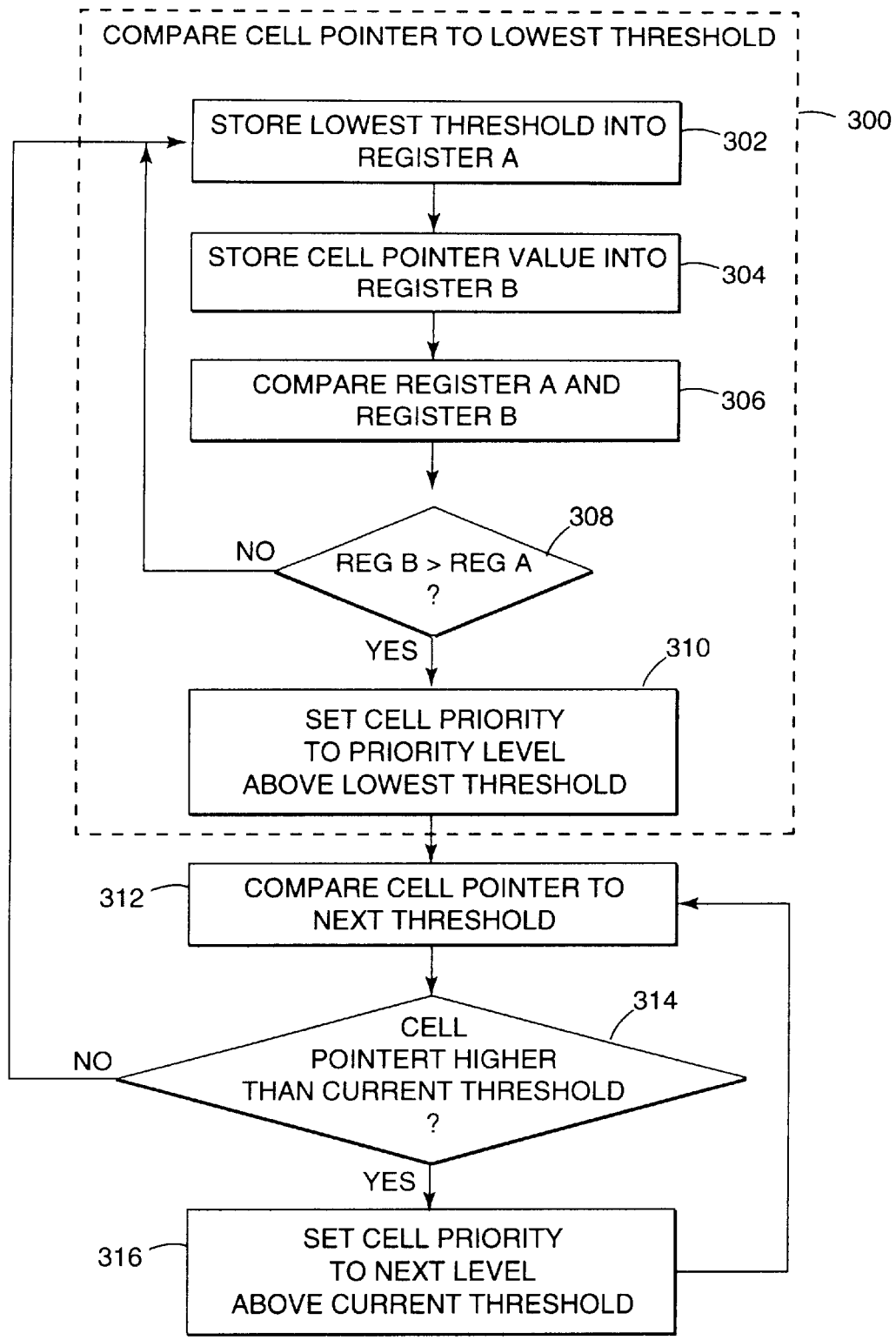
FIG. 9 is a flow diagram illustrating one manner of comparing priority threshold values to the current buffer occupancy levels.

Referring now to FIG. 9, a flow diagram is shown illustrating one manner of comparing priority threshold values to the current buffer occupancy levels. A first threshold, also the lowest threshold in this example, is compared 300 to the cell pointer value. This may be accomplished by temporarily storing 302 the lowest threshold, such as the threshold represented on line 282, into a register A. The cell pointer is stored 304 into another register B, and registers A and B are compared 306 to determine 308 whether the cell pointer corresponds to an occupancy level greater than the particular threshold value.

If it is determined 308 that the cell pointer value in register B is not greater than the first threshold value in register A, the process continues at block 302. If it is determined 308 that the cell pointer value in register B is greater than the first (e.g., lowest) threshold value in register A, the cell priority is set 310 to the next priority level above the first threshold value. For example, where the first threshold value corresponds to the threshold corresponding to threshold line 284, the priority level will be set to "1" where the cell pointer is at an occupancy level above line 284. The cell pointer is then compared 312 to the next threshold level in a manner analogous to comparing 300 the cell pointer to the first threshold. If it is determined 314 that the cell pointer value is higher, the cell priority is set 316 to the next priority level above the current threshold. This continues until it is determined 314 that the cell pointer value is not higher than the current threshold, wherein the last cell priority recorded is the priority level value sent from the priority threshold compare unit 264. It should be recognized that the functions illustrated in FIG. 9 are not restricted to a sequence illustrated by the flow diagram, as these functions may in fact be implemented in parallel.

Figure 10:
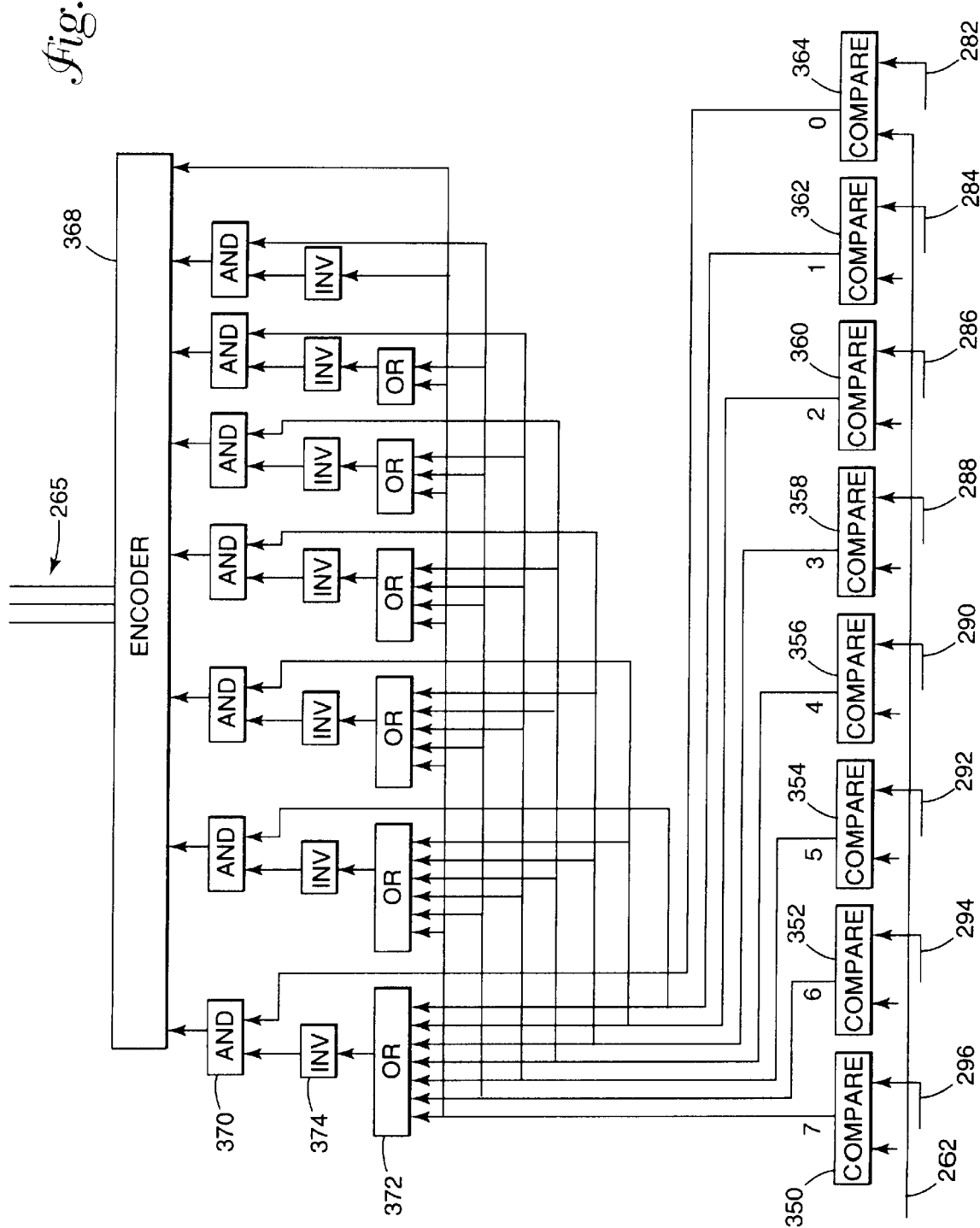
FIG. 10 is a block diagram of one embodiment of a priority threshold compare unit for performing the compare function of the priority threshold compare unit.

FIG. 10 is a block diagram of a priority threshold compare unit 264 which may perform the comparing function of the priority threshold compare unit 264 in accordance with one embodiment of the present invention. A plurality of comparing units 350, 352, 354, 356, 358, 360, 362 and 364 are used to compare each of the predetermined threshold values represented on lines 282, 284, 286, 288, 290, 292, 294 and 296 to the current cell pointer value 262. The priority threshold compare unit 264 will provide a priority value of "0" on connection 265 via the encoder 368 when compare unit 364 recognizes that the cell pointer is above threshold 282, and all of the other compare units 350–362 indicate that the cell pointer is below their respective thresholds. Both of these conditions are required as indicated by the AND-function 370. The requirement that the other compare units 350–362 indicate a cell pointer value below their respective thresholds is provided through the NOR-function provided via the combination of the OR 372 and INV (inverting) 374 functions.

As will become readily apparent to those skilled in the art, the remaining inputs to the encoder 368 are developed in an analogous manner. Such an arrangement may be implemented using hardware components, or is alternatively conducive to processor-controlled operation.

In one embodiment of the invention, the buffer 260 is implemented in a fashion analogous to that of a counter which can be incremented and decremented, and where the buffer has equally-spaced occupancy levels. The occupancy level of the buffer 260 is examined at each cell arrival at the virtual cell input 258. Therefore, the buffer/counter is not decremented continuously between cell arrivals. Instead, decrementing via the output 300 occurs concurrently with the arrival of a cell at the cell input 258. This implementation simplifies the occupancy level calculations, as calculations need only be performed upon each cell arrival.

Figure 11:
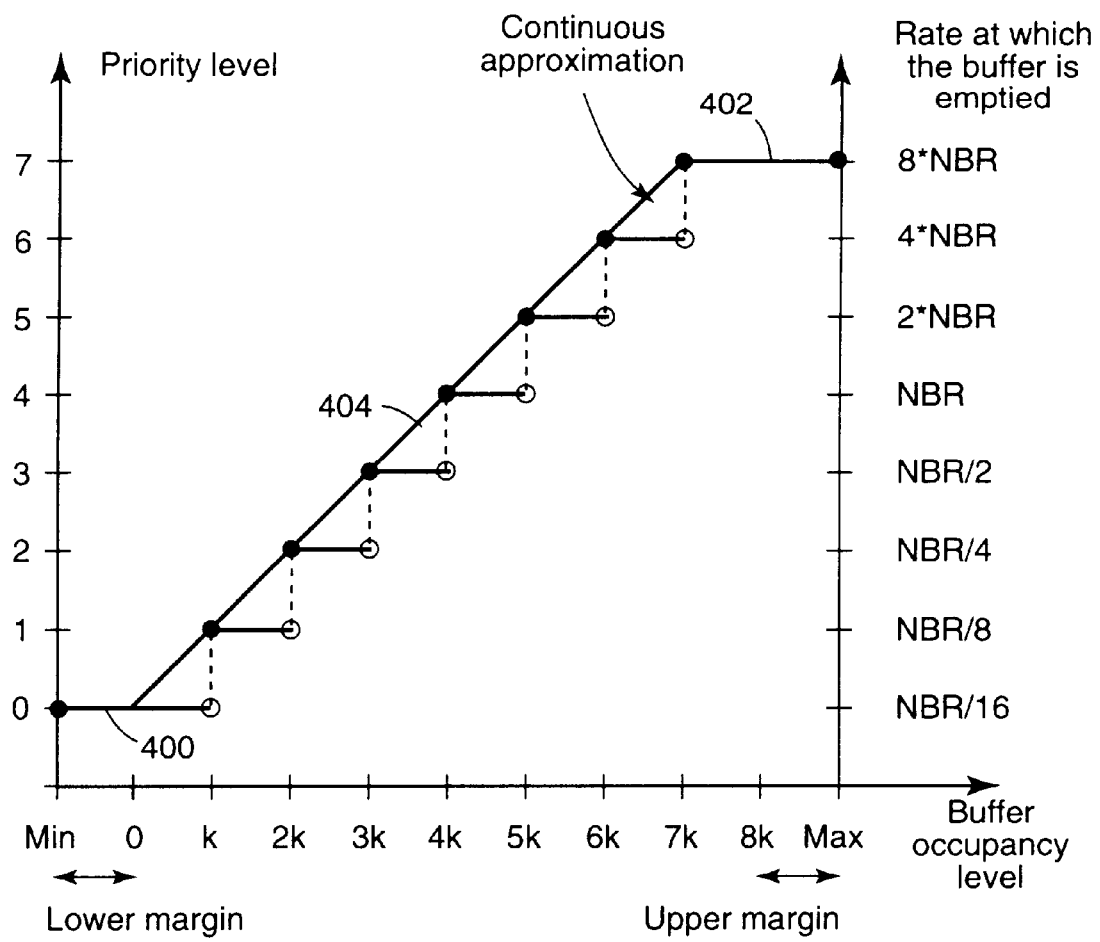
FIG. 11 is a graphical representation of the buffer occupancy level versus the rate at which the buffer is emptied where the buffer is implemented as a counter.

Referring now to FIG. 11, a graphical representation of the buffer 260 occupancy level versus the rate at which the buffer 260 is emptied is provided, where the buffer is implemented as a counter. In such a case, the counter values will fall in the range of 0 to 8 k, where k is the number of cells in one buffer occupancy range, such as in occupancy ranges 266–280 shown in FIG. 8. The lower and upper ranges corresponding to priority levels 0 and 7 respectively, illustrated on lines 400 and 402, may have a range wider than one buffer occupancy range k, as shown in FIG. 11. Therefore, where a cell sourcing unit has been providing cells at a rate higher than 8 times the nominal bit rate (8*NBR) at a priority level of 7, it will take longer to decrease to priority level to 6 than if it had been sending cells at a rate equal to 8*NBR. Correspondingly, if the cell source unit has been sending cells at a very low rate such that the cells are at a priority level of 0, it will take longer to increase the priority level to a priority level of 1.

In order to simplify the calculations, an approximation of the step function illustrated in FIG. 11 is provided by a continuous line 404. This approximation results in the counter value decrement rate being a continuous function of the buffer occupancy level. This approximation also allows the buffer occupancy level to be represented by a real number rather than an integer value. The approximation is such that it gives the same values as the step function at the points in which the priority value of a cell changes. Therefore, the approximation does not significantly affect the priorities assigned to the cells.

Figure 12:
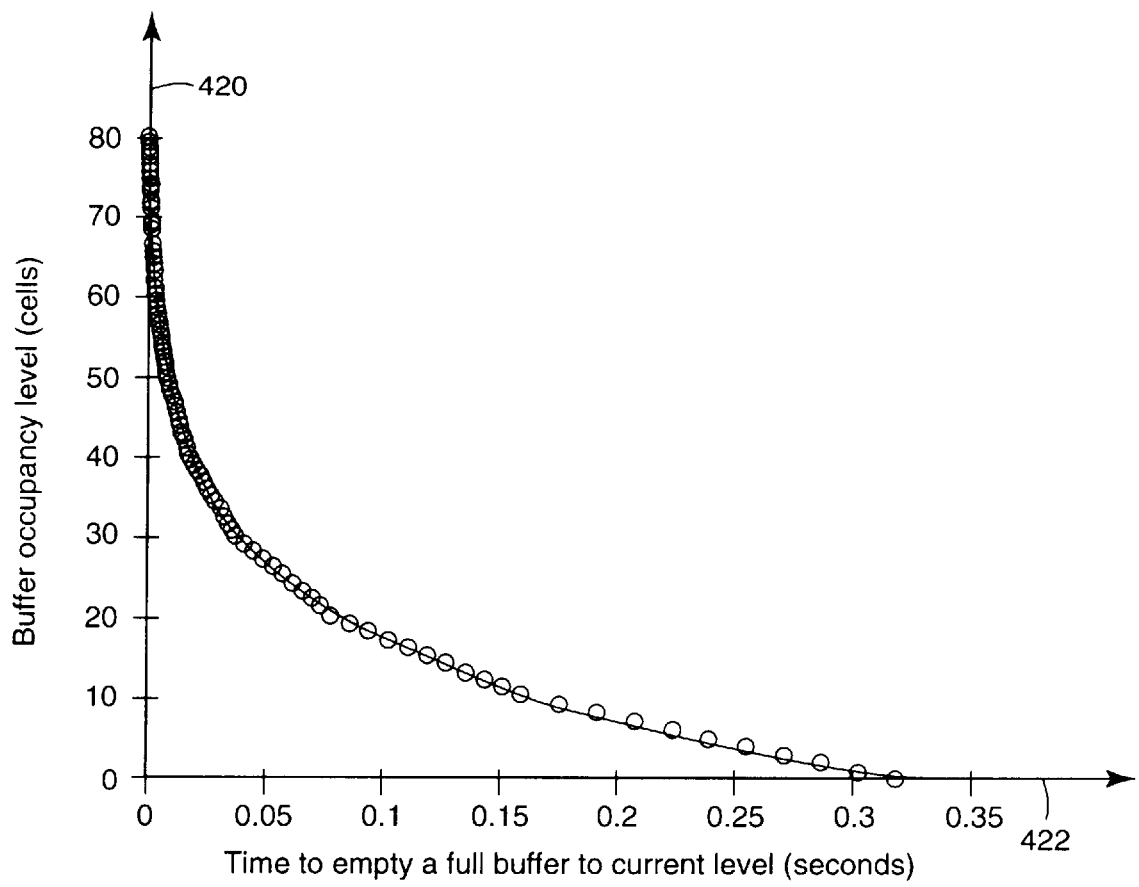
FIG. 12 is a graphical illustration of the decreasing buffer occupancy level as a function of time from a full occupancy level where no cell arrivals occur.

FIG. 12 is a graphical illustration of the buffer occupancy level 420 as a function of time 422 when the buffer 260 is full at time t equals 0, and no cell arrivals occur. This function provides the basis of the approximation of the step function of FIG. 11. In this example the total buffer occupancy level is 80 cells, where k equals 10, and the NBR of the cell sourcing unit is 1,000 cells per second. A high buffer occupancy level indicates that the cell output source 252 has been sending cells at a higher rate than the NBR, which results in a high priority level assignment, which causes the virtual cell output enable circuit 298 to direct a high cell discharge rate from the output 300 of the buffer 260. As the buffer occupancy level decreases over time, the emptying rate at which cells are discharged from the buffer 260 is reduced as a result of a decreasing priority value.

Figure 13:
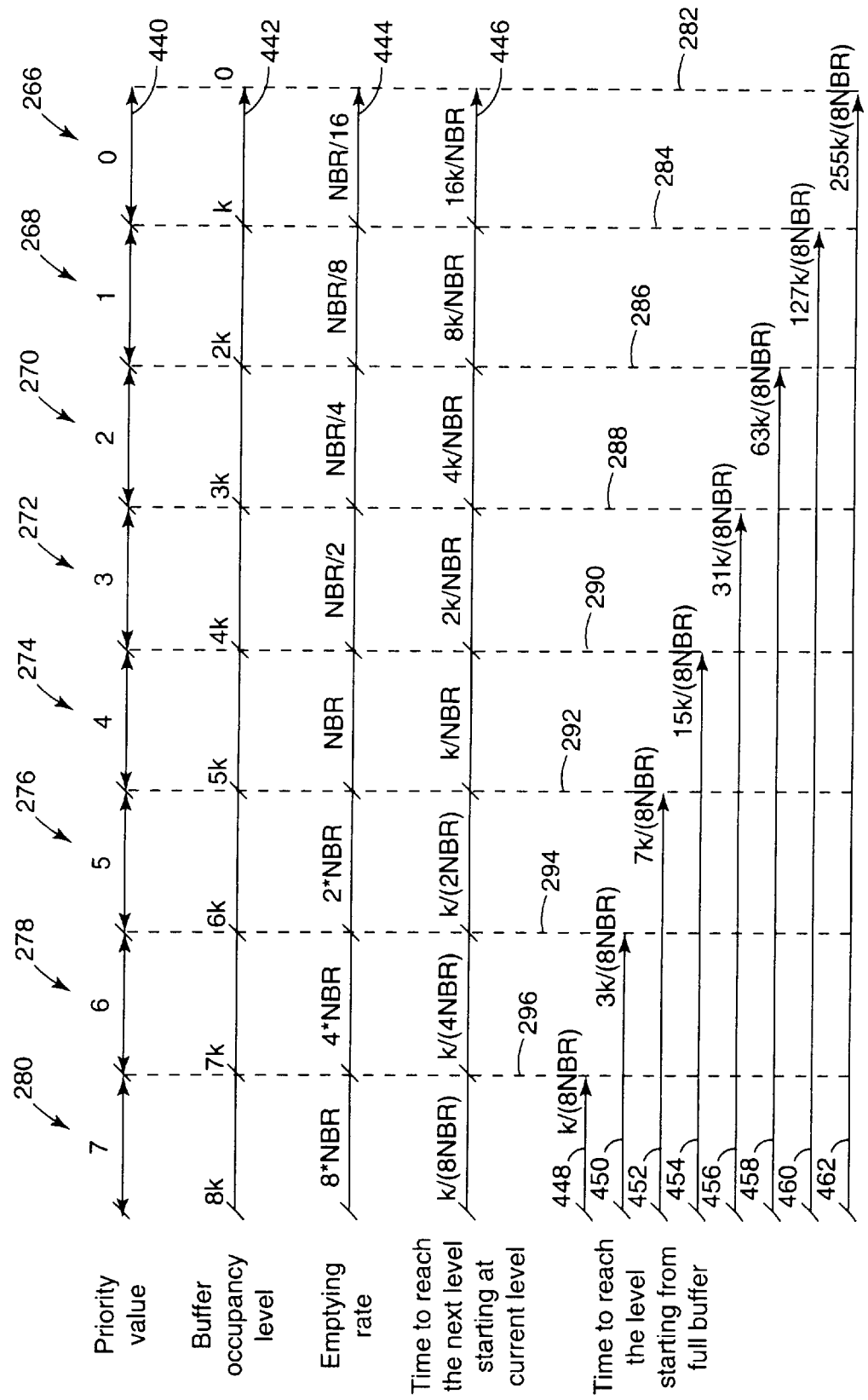
FIG. 13 is a graphical representation of the relationship between the buffer occupancy level, the emptying rate, and various buffer discharge times where the buffer occupancy levels are equally spaced.

FIG. 13 is a graphical representation of the relationship between the buffer occupancy level, the emptying rate, and various buffer discharge times where the buffer occupancy levels are equally spaced. The various buffer occupancy level thresholds 282–296 are shown, as are the different occupancy levels 266–280. The corresponding priority level values and buffer occupancy levels are illustrated at rows 440 and 442 respectively. The rate at which the cell output enable circuit 298 enables the output 300 to empty the buffer 260 is illustrated at row 444. The duration of time required to reach an adjacent threshold level from a current threshold level is illustrated at row 446, which illustrates that the time required to reach the next level is an increasing function as the priority level decreases due to the decreasing emptying rate shown on line 444. Lines 448, 450, 452, 454, 456, 458, 460 and 462 represent the times required to reach a particular threshold level starting from the time corresponding to a full buffer 260. For example, line 450 represents the time that it would take for a full buffer 260 to decrease to an occupancy level corresponding to the predetermined threshold value of line 294 where no cell arrivals occur. Because the cell discharge rate decreases by a factor of 2 as the priority level decreases, the time required to reach the next threshold level doubles. Therefore, the time on line 450 is derived by adding the time corresponding to the occupancy level 278 to the time corresponding to occupancy level 280 from line 448. The times required to reach particular levels from a full buffer was depicted graphically in FIG. 12.

By understanding the nature in which the buffer is emptied, the number of cells that have been output from the buffer 260 since a previous cell arrival can be calculated. In one embodiment of the invention, this is accomplished by calculating the time (t) taken to empty a full buffer 260 to the current occupancy level (OL), adding the time passage from the arrival of the previous cell to the arrival time of the currently-received cell (dt), and evaluating the buffer occupancy level at the current time. The current cell arrival is then added to the calculated buffer occupancy level to determine the total occupancy level at the time of the arrival of the current cell.

Figure 14:
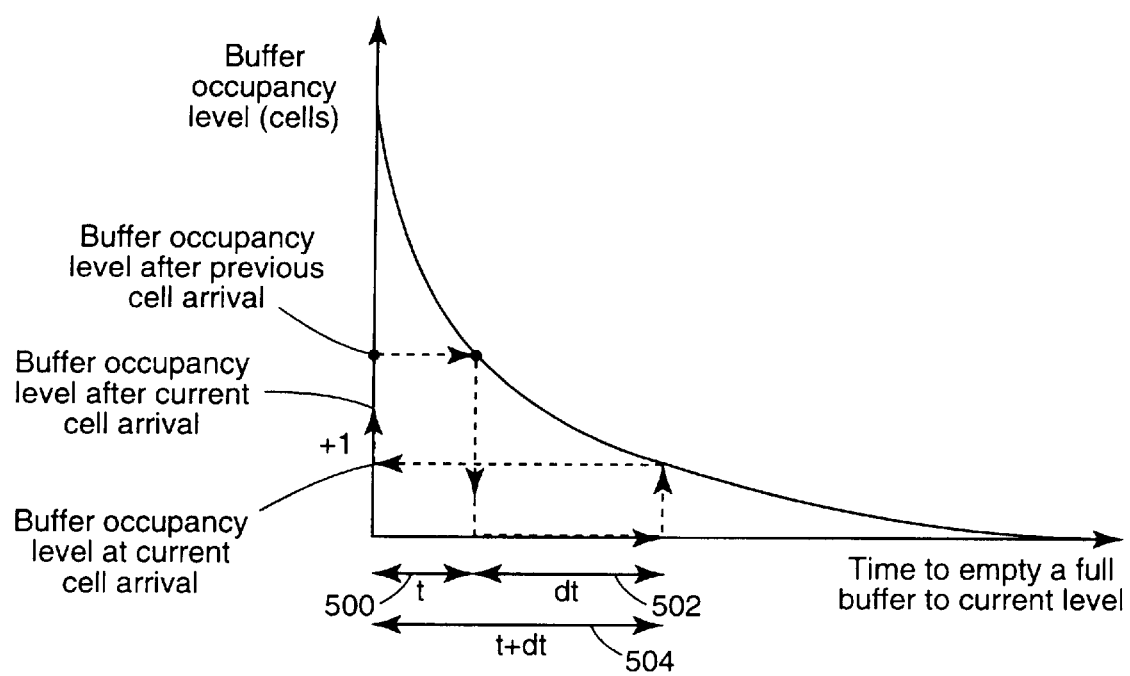
FIG. 14 graphically illustrates the calculation of the number of cells discharged from the buffer between any two cell arrivals.

FIG. 14 graphically illustrates the calculation of the number of cells discharged from the buffer 260 between any two cell arrivals. The time (t) corresponding to the time required to empty a full buffer to the existing occupancy level (i.e., the occupancy level after arrival of the previous cell) is calculated as shown in Equation 2 below:

$$t = \frac{k}{8 \cdot NBR} \cdot [2^{8-OL/k} - 1] \quad [2]$$

The occupancy level (OL) at the cell arrival is determined at time (t+dt) using Equation 3 below:

$$OL(t + dt) = \left[8 - \log_2\left(\frac{NBR}{k}\right) \cdot 8 \cdot (t + dt) + 1\right] \cdot k + 1 \quad [3]$$

Equation 3 above determines the occupancy level at the current cell arrival time, taking into account the additional one cell which arrived as well. The occupancy level is converted to a corresponding priority level in the manner described in Equation 4 below:

$$PL = \min\{7, \max[0, \text{truncate}(OL/k)]\} \quad [4]$$

Referring again to FIG. 14, the time (t) represented on line 500 corresponds to the required to empty a full buffer to the current occupancy level prior to receiving the new cell, which can be determined using Equation 2 above. The time (dt) represented on line 502 corresponds to the time from the previous cell arrival until the current cell arrival. The total time (t+dt) illustrated on line 504 therefore corresponds to the time elapsed after the new cell arrival. The occupancy level (OL) can then be calculated using Equation 3 above, and the priority level (PL) is determined using the occupancy level calculated in Equation 4.

Figure 15:
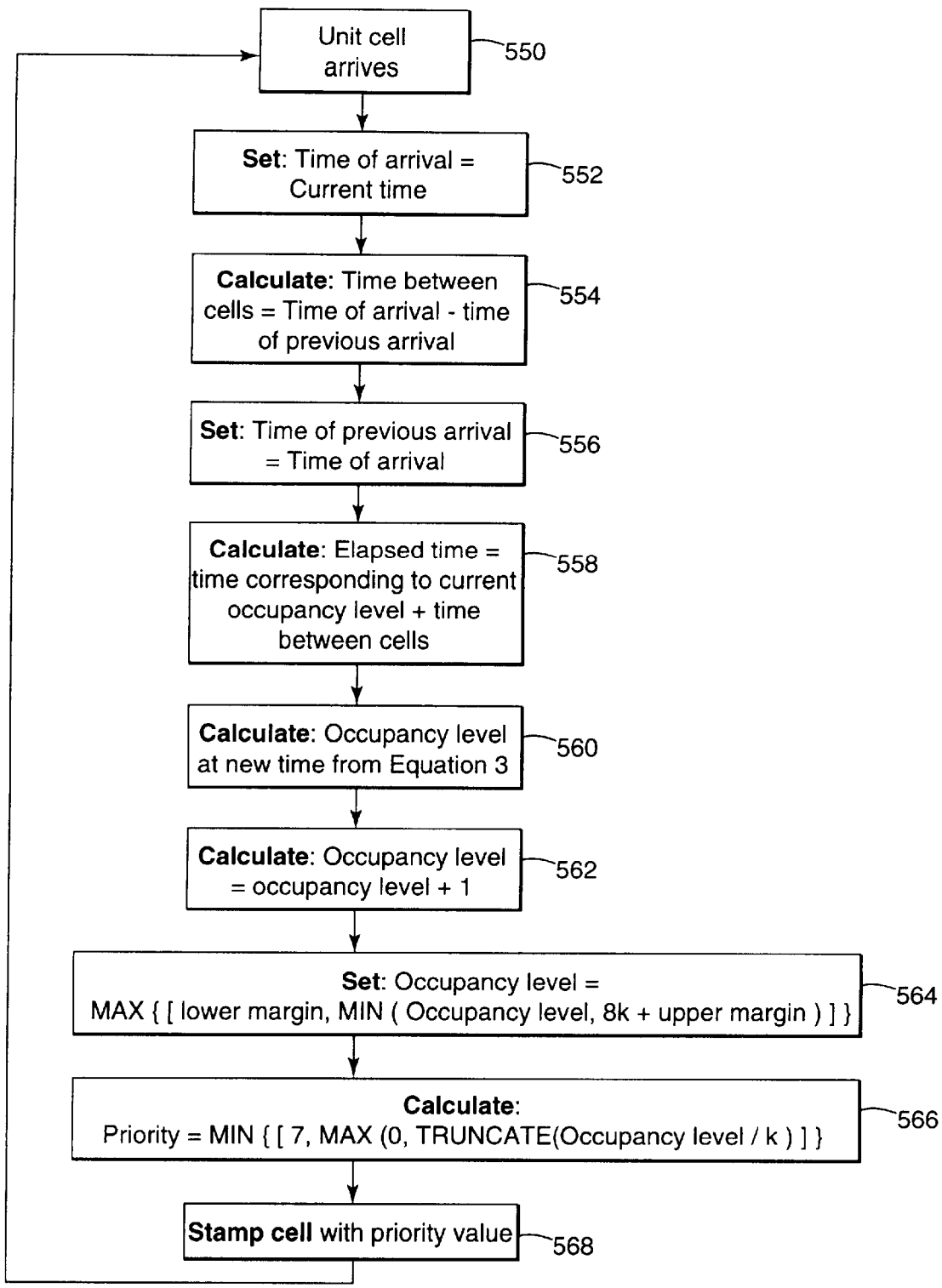
FIG. 15 is a flow diagram illustrating one embodiment of the invention for the equally spaced buffer occupancy level implementation.

FIG. 15 is a flow diagram illustrating one embodiment of the invention for the equally spaced buffer occupancy level implementation described in connection with FIGS. 11–14. When a new cell arrives 550, the time of arrival is set 552 to equal to the current time. Because the time of the previously received cell arrival is known, the time period between the arrival of the previous cell and the current cell can be calculated 554 as the time of arrival minus the time of the previous cell arrival. This new cell arrival time is then set 556 to the time of previous arrival for use when the next cell arrives. The elapsed time is calculated 558 by adding the calculated time between cells 554 and the time corresponding to the current occupancy level of the buffer 260, which is calculated using Equation 2. The occupancy level can then be calculated 560 Equation 3. The total occupancy level is calculated 562 by adding the single cell arrival to the occupancy level previously calculated 560. The occupancy level is then set 564 to the maximum of the lower margin, and a value corresponding to the minimum of either the occupancy level or the upper margin plus 8 k. The priority level is calculated 566 using the calculated occupancy level 564, as was shown in Equation 4. The calculated priority value is assigned 568 to cells being output from the cell output source 252.

In another embodiment of the invention, the buffer 260 is again implemented analogously to that of a counter, but where the buffer has logarithmically-spaced buffer occupancy levels. With equally-spaced buffer occupancy levels, the time required to decrease one priority level depends on the current priority level. For example, the higher the priority value, the faster the priority value is decremented, as was illustrated in FIG. 12. This condition, however, can be modified by adjusting the buffer occupancy levels that establish the priority values. In one embodiment of the invention, the occupancy levels are set such that the time taken to decrease one priority level is the same, regardless of the current occupancy level. This is illustrated in FIG. 16 below, where each occupancy range includes twice as many cells as the previous occupancy range.

Figure 16:
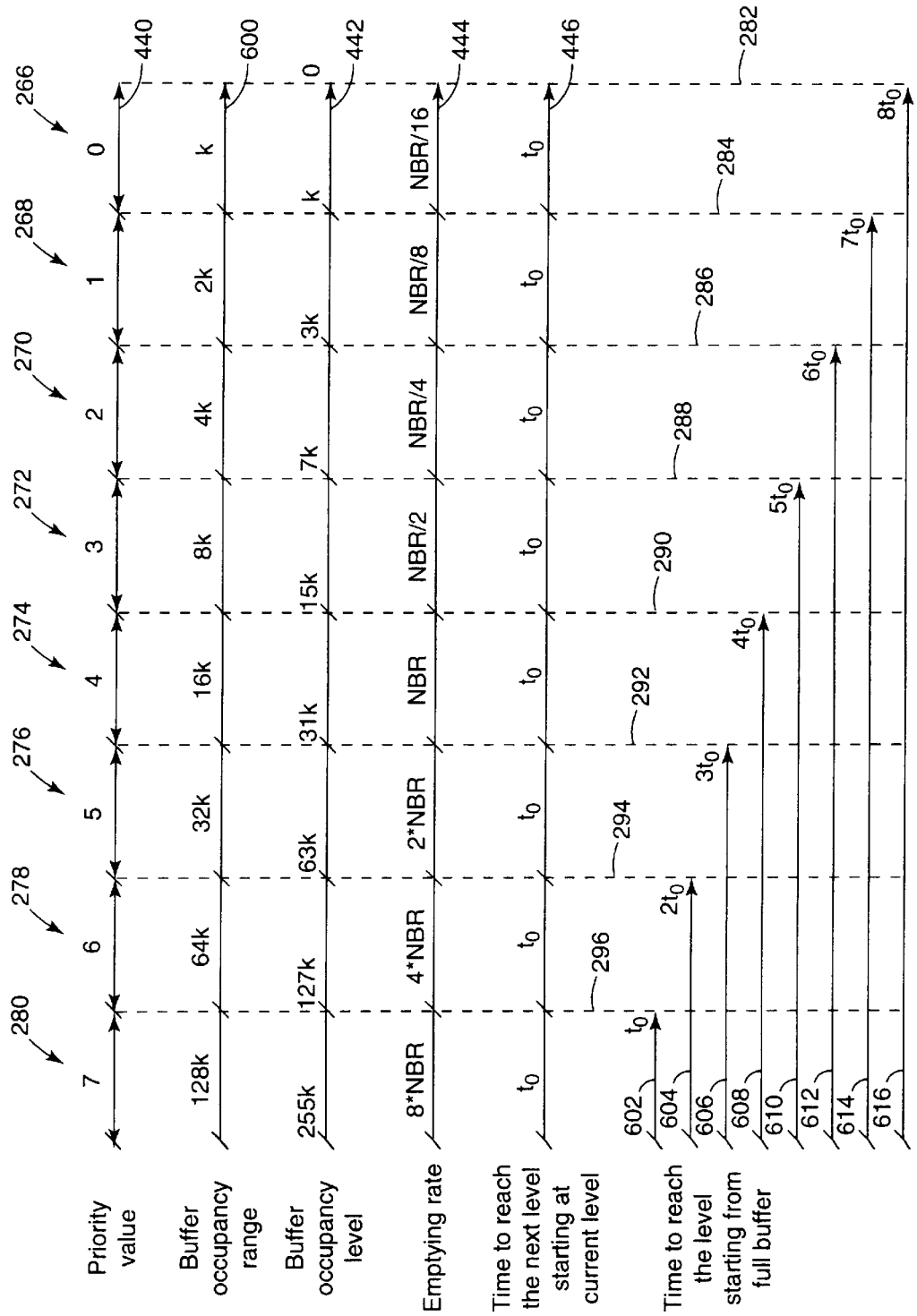
FIG. 16 is a graphical representation of the relationship between the buffer occupancy level, the emptying rate, and various buffer discharge times where the buffer occupancy levels are logarithmically spaced.

FIG. 16 is a graphical representation of the relationship between the buffer occupancy level, the emptying rate, and various buffer discharge times where the buffer occupancy levels are logarithmically spaced. The various buffer occupancy level thresholds 282–296 are shown, as are the different occupancy levels 266–280. The corresponding priority level values, buffer occupancy ranges, and buffer occupancy levels are illustrated at rows 440, 600 and 442 respectively. As seen from FIG. 16, the buffer occupancy level on line 442 is doubled for each increasing occupancy range 266–280. The buffer occupancy ranges shown on line 600 illustrate that the occupancy range doubles at the priority level increases. The rate at which the cell output enable circuit 298 enables the output 300 to empty the buffer 260 is illustrated at row 444. The time required to reach an adjacent threshold level from a current threshold level is illustrated at row 446, which illustrates that the time required to reach the next level is not an increasing function as the priority level decreases as was illustrated in FIG. 13, but rather is an equal time. Lines 602, 604, 606, 608, 610, 612, 614 and 616 represent the times required to reach a particular threshold level starting from the time corresponding to a full buffer 260. As can be seen, the time to reach these various levels are determined simply by taking the sum of each of the equal times to shown on line 446 until reaching the appropriate level. For example, line 608 represents the time that it would take for a full buffer 260 to decrease to an occupancy level corresponding to the predetermined threshold value of line 290 where no cell arrivals occur. The time on line 608 is derived by adding the time corresponding to the occupancy levels 280, 278 and 276 to the time corresponding to occupancy level 274, all of which are an equal time of $t_0$.

Figure 17:
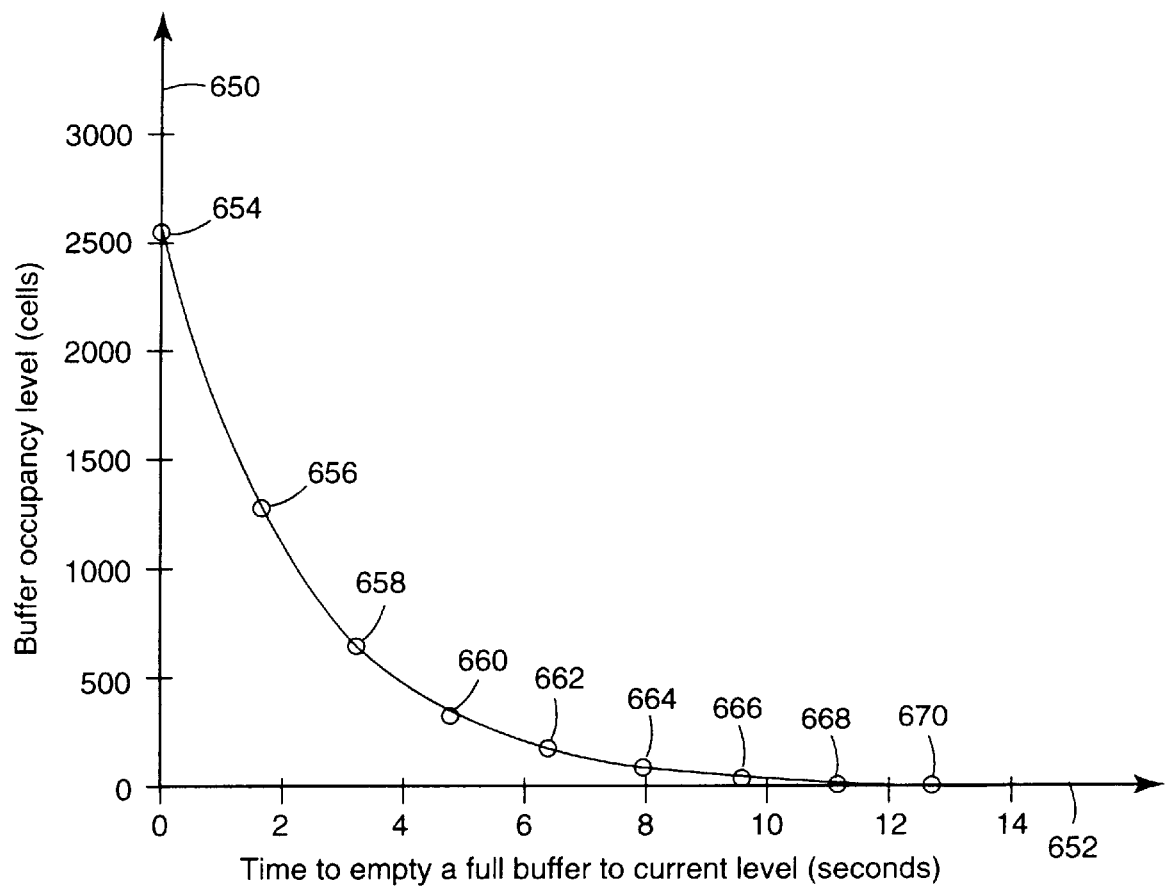
FIG. 17 is a graphical illustration of the logarithmically decreasing buffer occupancy level as a function of time where no cell arrivals occur.

FIG. 17 is a graphical illustration of the buffer occupancy level 650 as a function of time 652 when the buffer 260 is full at time t equals 0, and no cell arrivals occur where the buffer occupancy levels are logarithmically spaced. The priority transition points 654, 656, 658, 660, 662, 664, 666, 668 and 670 designate the decreasing occupancy level as a function of time. The time between each of the priority transition points 654–670 is equal, while the number of cells discharged during each increasing time interval is reduced by a factor of two.

The time (t) corresponding to the current occupancy level for the buffer discharge times where the buffer occupancy levels are logarithmically spaced is calculated as shown in Equation 5 below:

$$t = \frac{16k}{NBR}[8 - \log_2(OL/k + 1)] \quad [5]$$

The occupancy level (OL) at the time of cell arrival is determined using Equation 6 below, where time dt is the elapsed time from the arrival of the previous cell:

$$OL(t + dt) = (2^{8 - t/t_0} - 1) \cdot k + 1 \quad [6]$$

-continued where $t_0 = 16\left(\dfrac{k}{NBR}\right)$.

The priority value assigned to the cell is calculated using Equation 7 below:

$$PL = \log_2\left(\dfrac{OL}{k} + 1\right) \quad [7]$$

Figure 18:
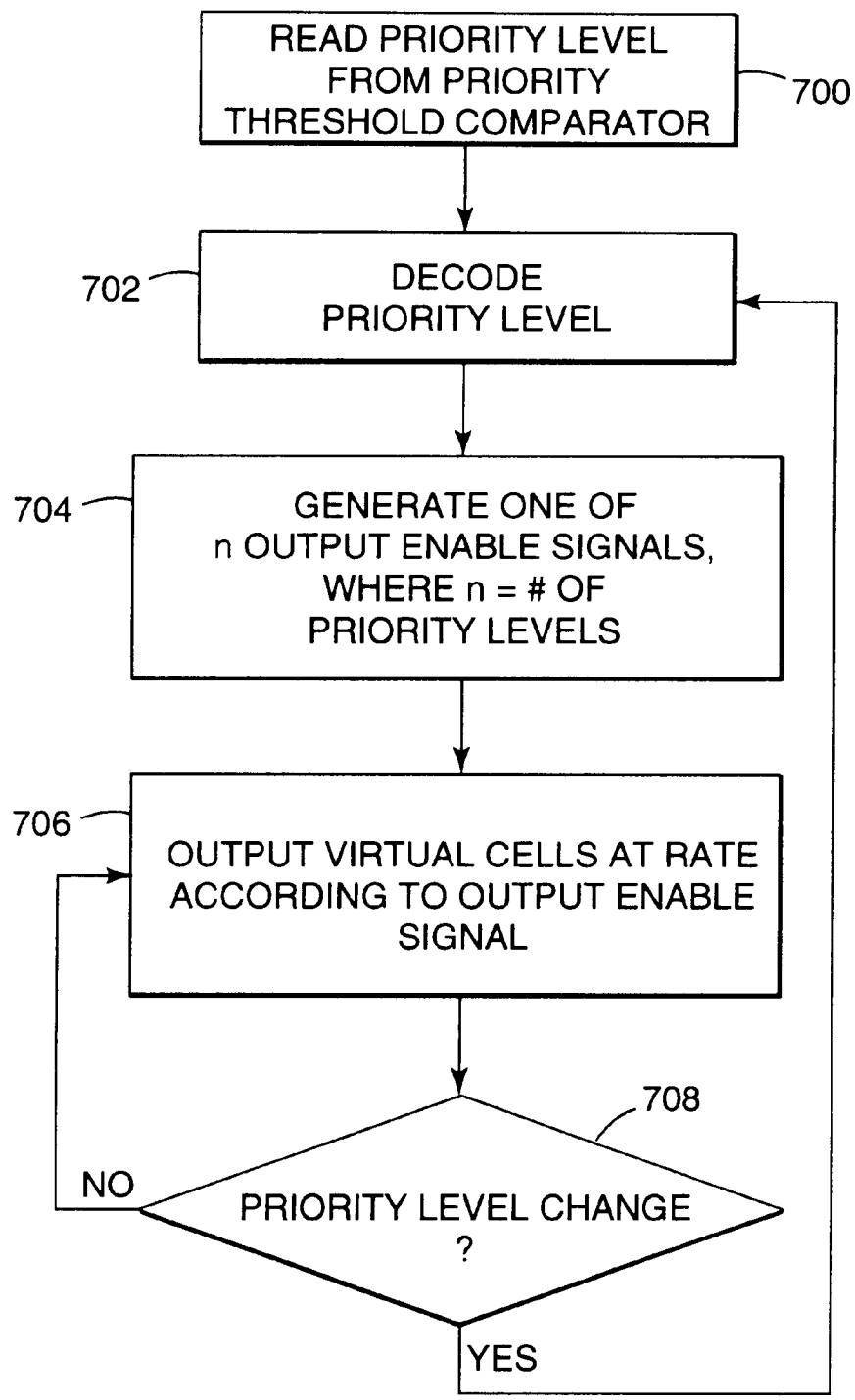
FIG. 18 illustrates in flow diagram form a general methodology for which the output rate of the virtual cells from the buffer is modified.

FIG. 18 illustrates in flow diagram form a general methodology for which the output rate of the virtual cells from the buffer 260 is modified. The priority level from the priority threshold comparator 264 is read 700, and the corresponding value is decoded 702 into n levels, where n depends on the number of priority levels implemented. It should be recognized that the cell pointer value can alternatively be directly read, rather than the priority value from the priority threshold comparator 264, where the cell pointer value would be directly used to allow the cell output enable circuit 298 to control the output 300.

As previously indicated, one embodiment of the invention includes eight priority levels which can be encoded into three bits, resulting in a three bit priority level and 8 decoded levels. One of n output enable signals is generated 704, which in turn controls the rate at which virtual cells are discharged 706 from the buffer 260. When a priority level change is detected 708, the output enable signal is reconfigured according to the new priority level. Otherwise, until the priority level changes 708, the virtual cells continue to be output 706 at the same rate.

In another embodiment of the invention, the cell pointer value is read by the cell output enable circuit 298, and one of the n output enable signals is generated therefrom by analyzing the cell pointer value rather than receiving a priority value from the priority threshold compare unit 264. In such a case, the virtual cell output enable circuit 298 must determine which buffer occupancy level the cell pointer is associated with. This can be accomplished using hardware components in a manner analogous to the previous description of the priority threshold compare unit 264, or can alternatively be accomplished using known software techniques.

Figure 19:
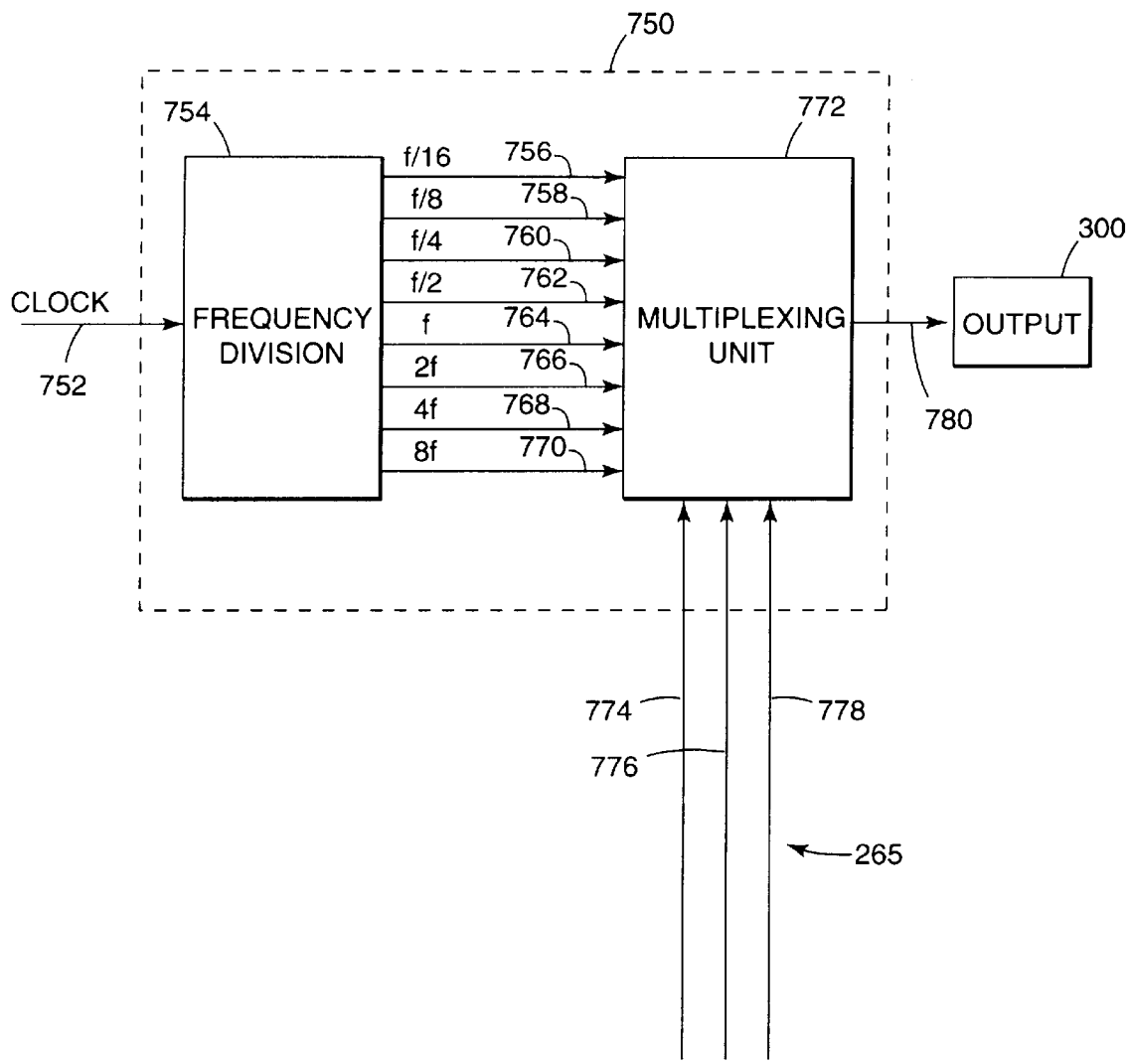
FIG. 19 provides one example of a cell output enable circuit in accordance with the present invention.

Referring now to FIG. 19, one example of a cell output enable circuit 750 is illustrated. An oscillating input clock signal shown on line 752 is input into a frequency division unit 754. The frequency division unit 754 provides a plurality of output signals of various multiples of the clock frequency of the clock signal on line 752. In this example, an 8:1 frequency division occurs resulting in eight different output enable signals on lines 756, 758, 760, 762, 764, 766, 768 and 770. The generated signal waveforms are fed into a multiplexing unit 772. The multiplexing unit 772 is controlled by control lines 774, 776 and 778, which, in one embodiment of the invention, comprises the priority value on connection 265 shown in FIG. 8. Depending on the state of the control lines, the multiplexing unit 772 selects one of its inputs on line 756–770 to be output to the output circuit 300 on line 780. The output circuit 300 allows virtual cells from the buffer 260 to be discharged at each occurrence of a pulse or transition level of the signal on line 780.

Other embodiments of cell output enable circuits 298 and 750 can be implemented without departing from the scope and spirit of the invention. For example, the signals on control lines 774, 776 and 778 can be input into a 3:8 decoder, where each of the eight decoded signals feeds an individual tri-state driver whose outputs are commonly coupled as the output enable signal. Each of the tri-state drivers would have a different input clock signal which would be selected when its respective enable input was activated by a selected signal on the 3:8 decoder. In yet another embodiment, the cell output enable circuit 298 can be a computing device, or a portion thereof, operating under the control of software that regulates the rate at which virtual cells are output from the buffer 260.

For purposes of illustration, and not of limitation, examples are provided below to illustrate the relationship between the quality of service of an NBR or SIMA connection and throughput at different priority levels. The following examples demonstrate, in accordance with one embodiment of the present invention, the relative differences in QoS with respect to adjacent priorities, such as the QoS associated with PL=4 in comparison to that of PL=3. It is noted that a higher cost or fee is typically assessed to users who request a higher priority for cells transmitted from the user's user/network interface. By way of example, the user fee may be doubled if the user wants to obtain one degree of higher priority for every cell without changing the actual bit rate. The resulting QoS of the connection, therefore, should be improved such that at least some users are willing to pay the additional charge.

EXAMPLE #1

In accordance with this illustrative example, the following assumptions and consideration are given. It is assumed that there are many identical traffic sources which generate traffic independent of the current or previous load conditions in the network. The following traffic parameters are assumed: the link capacity is C=1, which is useful in the examples as a means of normalization; the peak bit rate $MBR_{max}$=0.1, which represents 10 percent of the link capacity, C; the ON probability at the burst (or packet) scale=0.2; and the average burst duration=1,000 time slots (i.e., the average packet size=100 cells). In addition, it is assumed that there is an upper ON/OFF layer, and that both the average ON-period and OFF-period of this layer are 100,000 time slots. The real time buffer 93 contains 200 cell locations and the non-real-time buffer 94 contains 5,000 cell locations. It is noted that the upper ON/OFF layer attempts to model the traffic process of connections, in which the determination of the number of connections is understood in the art to constitute a stochastic, random process. For example, if it is assumed that the total number of customers is represented by the variable x, then the average number of connections is x/2. More particularly, the number of connections is understood to be binomially distributed. As such, 100,000 time slots represent the average holding time of a connection, and, also, the average idle period realizable by the user. As a consequence, a user is transmitting cells only if a connection is active both at the connection layer and the packet layer. A time scale parameter, α, can be obtained for the real-time and non-real-time connections:

$\alpha_{rt} = 0.025$ $=_{nrt} 0.001$

In this example, eight different connection types are assumed: four connections are real-time connections and four are non-real-time connections. Also, four different NBR values, which have been normalized with respect the link capacity of C=1, are assumed as: 0.2, 0.1, 0.05 and 0.025. The priorities corresponding to these NBR values, with MBR$_{max}$=.1, are 3, 4, 5 and 6, respectively. It should be noted, however, that not all cells are assigned these exact priorities, and that especially with non-real-time connections, many cells obtain better priority values because of the affects of the averaging measuring principle. The distribution of cells having different priority levels, represented as percentages, is presented below in Table 2:

TABLE 2

| PRIORITY LEVEL | REAL (SIMULATED) PERCENTAGE OF OFFERED CELLS | PERCENTAGE BASED ON PEAK RATES |
| --- | --- | --- |
| 1 | 6.1 | 0 |
| 2 | 7.9 | 0 |
| 3 | 24.3 | 25 |
| 4 | 23.5 | 25 |
| 5 | 21.5 | 25 |
| 6 | 16.8 | 25 |

Figure 20:
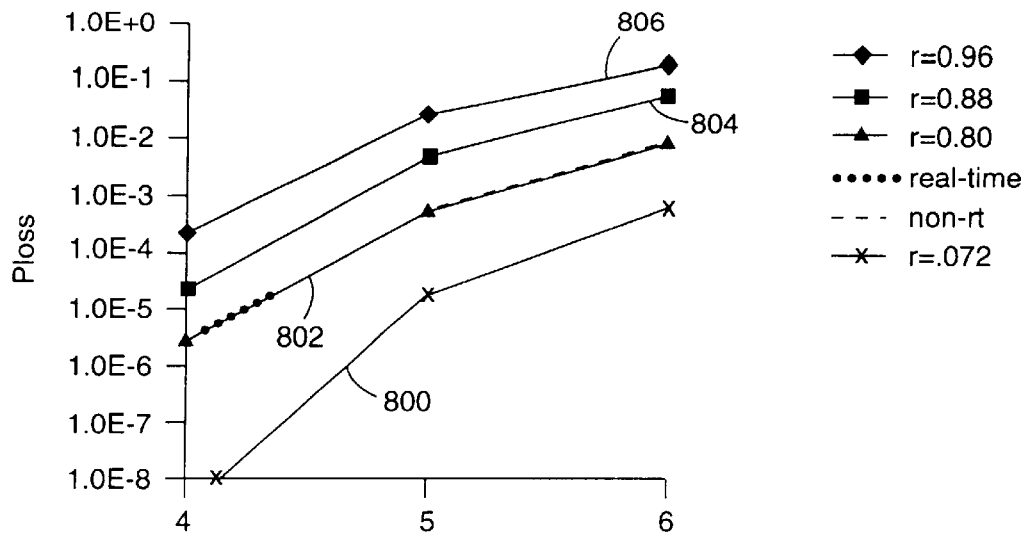
FIGS. 20–21 are graphical depictions of the relationship of average cell loss ratio, $P_{loss}$, as a function of priority level for four specific load levels.

In FIG. 20, there is shown a graph illustrating the relationship of average cell loss ratio, P$_{loss}$, as a function of priority level for four specific load levels, r. In particular, line-800 represents an overall average load level of 0.72 for 9 connections of each connection type (i.e., real-time and non-real-time connection types). Line-802 depicts an average load level of 0.80 for 10 connections of each connection type. Further, line-804 represents an average load level of 0.88 for 11 connections of each connection type, and line-806 represents an average load level of 0.96 for 12 connections of each connection type. It is noted that, in the case of line-802 indicating a load level of 0.80, the cell loss ratios, P$_{loss}$ for real-time and non-real-time cells are indicated by dotted and broken lines, respectively.

Given, for example, a traffic scenario where the operator wants to offer a cell loss ratio of 10$^{-6}$ to cells with priority 4, the total load can be approximately 0.75. It can be assumed that this average cell loss ratio is sufficient for most video applications. Give the same traffic load conditions, priority level 5, which corresponds to P$_{loss}$≈10$^{-4}$, can meet the requirements of many voice applications, while priority 6, which corresponds to P$_{loss}$≈3.10$^{-3}$, is suitable for a TCP/IP type of file transfer, provided that there is an adequate packet discarding scheme in place.

It should be emphasized, however, that the difference in cell loss ratio between adjacent priorities depends strongly on the offered traffic process and, in particular, the inherent control loops of the NBR or SIMA service. When the user perceives an unsatisfactory QoS, for example, the user can, and should, change either the actual bit rate or the nominal bit rate of the connection. In either case, the priority distribution changes as well. Nevertheless, if this phenomenon is temporarily ignored, the basic behavior of priority distribution may be further appreciated by making the following simplifying assumption: If it is assumed that all traffic variations are slow as compared to the measuring period and buffer size, then a well-known, conventional ATM approach to approximating cell loss ratio may be used, with the additional requirement that the eight NBR priority levels are taken into account.

If the loss ratio of cells with priority k is denoted by P$_{loss,k}$, and the average loss ratio of cells with a priority of 0 to k is denoted by P*$_{loss,k}$, then the following equation, which ignores buffering effect, provides that:

$$P^*_{loss,k} = \frac{\sum_{j:\lambda_j > c} \Pr\{\lambda^*_k = \lambda_j\}(\lambda_j - c)}{\rho^*_k c}$$ [8]

$$P_{loss,0} = P^*_{loss,0}$$

$$P_{loss,0} = \frac{\rho^*_k P_{loss,k} - \rho^*_{k-1} P^*_{loss,k-1}}{\rho^*_k - \rho^*_{k-1}} \quad \text{for } k = 1 \ldots 7$$

where, $\lambda^*_k$ represents the momentary bit rate level of all cells with a priority of 0 to k, $\pi^*_k$ represents the average offered load produced by these cells, and c represents the link capacity. The probability $\Pr\{\lambda^*_k \lambda_j\}$ can be calculated in a straightforward manner using known convolution techniques.

EXAMPLE #2

For purposes of further illustration, a second example is provided which assumes the same sources described in Example #1, except for the long ON and OFF periods. Because of the long periods reflected in Example #1, the peak rate always determines the cell priority. As the buffers are typically not capable of filtering any traffic variations, the allowed load in Example #2 is much lower than that in the original case of Example #1.

Figure 21:
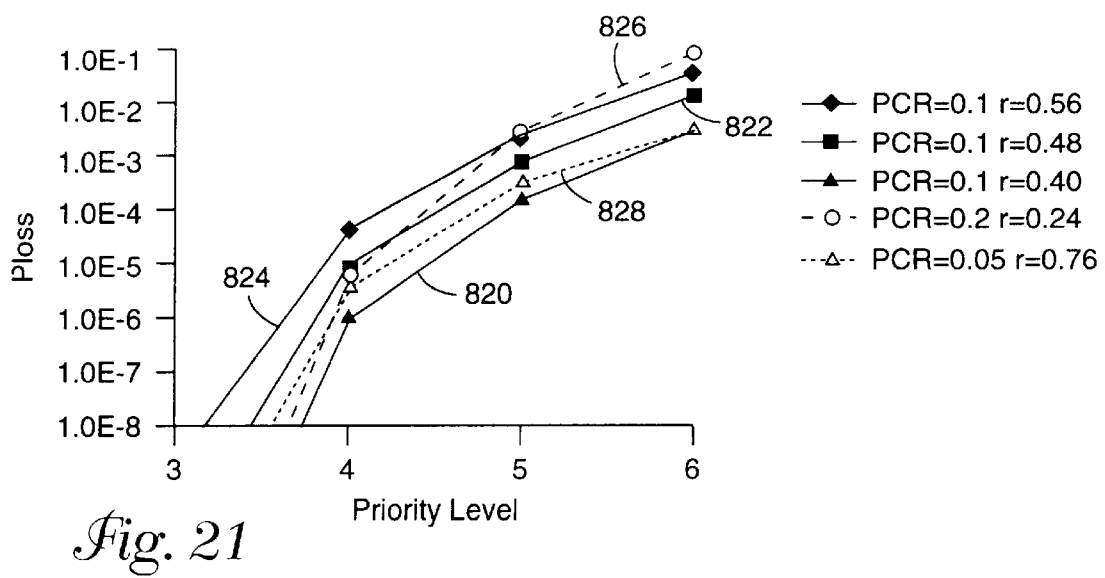

In FIG. 21, there is illustrated in graphical form a relationship between cell loss ratio as a function of priority level for different load levels, r. It is assumed in FIG. 21 that the peak cell rate of each connections depicted by solid lines 820, 822, 824 is 0.1, the peak cell rate of each connection depicted by the broken line-826 is 0.2, and the peak cell rate of each connection depicted by the dotted line-828 is 0.05.

FIG. 21 shows the cell loss probabilities obtained by application of Equation [8] for different priorities, depicted by the three solid lines, line-820, line-822, and line-824. In addition, two slightly different traffic cases are represented by the dotted line-828 and the broken line-826. The effects of changing the traffic variations are reflected in the graph provided in FIG. 21. The actual change in traffic variations is a direct consequence of doubling or halving bit rates and NBR values.

In a network that embraces the NBR/SIMA service concept, an increase of traffic variations has two main effects if the operator keeps the QoS of priority level 4 unchanged. First, the allowed load level is decreased in the same way as in conventional ATM, and second, the difference in cell loss ratio between adjacent priority level decreases. For purposes of providing a rough estimate of QoS based on FIGS. 20 and 21, it may be assumed that if priority level 4 offers a cell loss probability of 10$^{-6}$, then the cell loss probability will be approximately 10$^{-4}$ to 10$^{-3}$ with priority level 5 depending on the overall traffic variations. The cell loss ratio with priority level 3 may be assumed to be less than 10$^{-9}$, unless the traffic variations are very pronounced.

Although the above examples provide illustrations of relationships between QoS and priority levels, it may be unfruitful to attempt to exactly determine the allowed load or the cell loss difference between adjacent priority levels until user reactions to different QoS and usage charges are evaluated. In an NBR/SIMA service environment, a schedule of charges based on different QoS levels may be determined, in a certain sense, automatically. For example, if the difference in cell loss ratio between priority levels 4 and 5 is very small, it can be assumed that some of the connections will tend to move from priority level 4 to level 5 because of a lower assessed charge. This change indicates, apparently, that the cell loss ratio of priority level 4 decreases and the cell loss ratio of priority level 5 increases. It can be reasonably assumed that this type of movement continues until the QoS difference corresponds to the average user's expectation of a reasonable charging structure.

Similar concerns are raised with regard to the differences in charging which occur automatically during busy hours in contrast to idle hours. For example, it would appear reasonable to charge higher prices during periods of high load for a certain QoS, and charge lower prices during low load periods. However, it is believed desirable to avoid instigating a charging policy that assesses different fees for a certain NBR during busy and idle periods, which also avoids increasing the complexity of the charging scheme. The naturally occurring "supply and demand" effect may tend to automatically even out the load between busy and idle hours. It is anticipated that, if a user is displeased with the observable difference in QoS during busy and idle periods, the user may be motivated to pay a different rate during such periods.

It will, of course, be understood that various modifications and additions can be made to the preferred embodiments discussed hereinabove without departing from the scope or spirit of the present invention. Accordingly, the scope of the present invention should not be limited by the particular embodiments discussed above, but should be defined only by the claims set forth below and equivalents thereof.

What is claimed is:

1. A method of adjusting a transmission rate of information cells transmitted over a network connection, comprising:

transmitting a measurement cell to a measurement buffer substantially contemporaneously with respect to each transmission of an information cell to the network connection;

regulating an occupancy level of the measurement buffer;

generating a cell priority value in response to the occupancy level of the measurement buffer, the cell priority value indicating a probability of information cell acceptance at a node of the network connection; and assigning the cell priority value to information cells being transmitted to the network connection.

2. The method of claim 1, wherein generating the cell priority value further comprises determining the occupancy level of the measurement buffer.

3. The method of claim 1, wherein regulating the occupancy level of the measurement buffer further comprises increasing a discharge rate of the measurement buffer in response to an increase in the occupancy level of the measurement buffer and decreasing the discharge rate of the measurement buffer in response to a decrease in the occupancy level of the measurement buffer.

4. The method of claim 1, wherein generating the cell priority value further comprises decreasing the cell priority value in response to an increase in the occupancy level of the measurement buffer and increasing the cell priority value in response to a decrease in the occupancy level of the measurement buffer.

5. The method of claim 5, wherein the measurement buffer is arranged to include a plurality of buffer occupancy ranges, and generating the cell priority value further comprises generating the cell priority value that varies relative to the occupancy level falling within a particular one of the plurality of buffer occupancy ranges.

6. The method of claim 5, wherein regulating the occupancy level of the measurement buffer further comprises increasing a discharge rate of the measurement buffer in response to the occupancy level increasing from a current buffer occupancy range to a higher buffer occupancy range, and decreasing the discharge rate of the measurement buffer in response to the occupancy level decreasing from the current buffer occupancy range to a lower buffer occupancy range.

7. The method of claim 5, wherein generating the cell priority value further comprises decreasing the cell priority value in response to the occupancy level increasing from a current buffer occupancy range to a higher buffer occupancy range, and increasing the cell priority value in response to the occupancy level decreasing from the current buffer occupancy range to a lower buffer occupancy range.

8. The method of claim 1, wherein the network connection comprises a nominal bit rate connection.

9. A method of adjusting a transmission rate of information cells transmitted over a network connection, comprising:

transmitting a measurement cell to a measurement buffer substantially contemporaneously with respect to transmission of an information cell to the network connection, the measurement buffer configured to include a plurality of buffer occupancy ranges;

discharging measurement cells from the measurement buffer at a discharge rate that varies relative to a current occupancy level of the measurement buffer falling within a particular range of the plurality of buffer occupancy ranges;

generating a cell priority value having a magnitude that varies relative to the current occupancy level of the measurement buffer falling within the particular buffer occupancy range, the cell priority value indicating a probability of information cell acceptance at a node of the network connection; and assigning the cell priority value to information cells being transmitted to the network connection.

10. The method of claim 9, wherein the magnitude of the cell priority value decreases in response to a decrease in the discharge rate of measurement cells from the measurement buffer, and the magnitude of the cell priority value increases in response to an increase in the discharge rate of measurement cells from the measurement buffer.

11. The method of claim 9, wherein generating the cell priority value further comprises decreasing the magnitude of the cell priority value in response to the occupancy level of the measurement buffer increasing from the particular buffer occupancy range to a higher buffer occupancy range, and increasing the magnitude of the cell priority value in response to the occupancy level of the measurement buffer decreasing from the particular buffer occupancy range to a lower buffer occupancy range.

12. The method of claim 9, wherein the time to discharge the measurement cells from the measurement buffer remains substantially constant in a change from one cell priority value to the next.

13. A method of adjusting a transmission rate of information cells transmitted over a network connection, comprising:

transmitting a measurement cell to a measurement buffer substantially contemporaneously with respect to transmission of an information cell to the network connection, the measurement buffer configured to include a plurality of buffer occupancy ranges;

discharging measurement cells from the measurement buffer at a discharge rate that varies relative to a current occupancy level of the measurement buffer falling within a particular range of the plurality of buffer occupancy ranges;

generating a cell priority value having a magnitude that varies relative to the current occupancy level of the measurement buffer falling within the particular buffer occupancy range, the cell priority value indicating a probability of information cell acceptance at a node of the network connection;

assigning the cell priority value to information cells being transmitted to the network connection; and wherein each of the buffer occupancy ranges includes substantially the same number of cell storage locations, and a duration of time required to fill each of the buffer occupancy ranges increases exponentially as the current buffer occupancy level increases from the particular buffer occupancy range to a higher buffer occupancy range.

14. A method of adjusting a transmission rate of information cells transmitted over a network connection, comprising:

transmitting a measurement cell to a measurement buffer substantially contemporaneously with respect to transmission of an information cell to the network connection, the measurement buffer configured to include a plurality of buffer occupancy ranges;

discharging measurement cells from the measurement buffer at a discharge rate that varies relative to a current occupancy level of the measurement buffer falling within a particular range of the plurality of buffer occupancy ranges;

generating a cell priority value having a magnitude that varies relative to the current occupancy level of the measurement buffer falling within the particular buffer occupancy range, the cell priority value indicating a probability of information cell acceptance at a node of the network connection; and wherein each of the buffer occupancy ranges includes an exponentially larger number of cell storage locations than a preceding buffer occupancy range, and a duration of time required to fill each of the buffer occupancy ranges is substantially the same as the time required to fill other ones of the buffer occupancy ranges.

15. The method of claim 9, wherein the network connection comprises a nominal bit rate connection.

16. A system for adjusting a transmission rate of information cells transmitted over a network connection, comprising:

a source unit that transmits the information cells to the network connection;

a measurement buffer that receives measurement cells from the source unit, the source unit transmitting a measurement cell to the measurement buffer substantially contemporaneously with each information cell transmission;

a detector that detects an occupancy level of the measurement buffer, the detector producing an occupancy level signal indicative of a current occupancy level of the measurement buffer;

an output enable circuit, coupled to the detector, that controls a discharge rate of measurement cells from the measurement buffer in response to the occupancy level signal; and an encoder that encodes a priority value in each of the information cells, being transmitted over the network connection, the priority value indicating a probability of information cell acceptance at a node of the network connection and having a magnitude that, varies in response to the current occupancy level of the measurement buffer.

17. The system of claim 16, wherein the detector produces the occupancy level signal that varies relative to the current occupancy level of the measurement buffer.

18. The system of claim 16, wherein the measurement buffer is arranged to include a plurality of buffer occupancy ranges demarcated by a corresponding plurality of threshold values, and the detector produces the occupancy level signal that varies relative to detection of a particular one of the plurality of threshold values.

19. The system of claim 16, wherein the output enable circuit increases the discharge rate of measurement cells from the measurement buffer in response to an increase in the occupancy level of the measurement buffer, and decreases the discharge rate of measurement cells from the measurement buffer in response to a decrease in the occupancy level of the measurement buffer.

20. The system of claim 16, wherein the encoder encodes a priority value of a decreasing magnitude in response to an increase in the occupancy level of the measurement buffer, and encodes a priority value of an increasing magnitude in response to a decrease in the occupancy level of the measurement buffer.

21. A method for controlling a cell priority for cells transmitted from a network source unit to one or more network destination units across a network connection, comprising:

registering each of the cells transmitted from the network source unit in a measurement buffer;

discharging the registered cells in the measurement buffer at a discharge rate corresponding to a current buffer occupancy level of the measurement buffer;

generating a cell priority value correlating to one of a plurality of predetermined buffer occupancy ranges which coincides with the current buffer occupancy level wherein the priority value indicates a probability of information cell acceptance at a node of the network connection; and loading the cell priority value into the cells being transmitted from the network source unit to the one or more network destination units across the network connection.

22. The method of claim 21, further comprising establishing a nominal bit rate for the cells transmitted from the network source unit, and for presetting the cell priority value to a midpoint of a continuum of the priority values.

23. The method of claim 21, wherein registering each of the cells comprises providing a virtual cell in the measurement buffer for each of the cells transmitted from the network source unit.

24. The method of claim 21, wherein providing a virtual cell comprises generating a duplicate cell for each of the cells transmitted from the network source unit and storing the duplicate cell in the measurement buffer.

25. The method of claim 23, wherein providing a virtual cell comprises incrementing a buffer address pointer by one cell amount for each of the cells transmitted from the network source unit.

26. The method of claim 25, wherein discharging the registered cells comprises decrementing the buffer address pointer according to the discharge rate.

27. The method of claim 21, wherein registering each of the cells comprises buffering the cells transmitted from the network source unit in the measurement buffer.

28. The method of claim 21, wherein generating the cell priority value comprises identifying the buffer occupancy range that coincides with the current buffer occupancy level by comparing the current buffer occupancy level to a plurality of threshold values separating the plurality of predetermined buffer occupancy ranges.

29. The method of claim 21, wherein generating a cell priority value comprises encoding the cell priority value into n bits, wherein a number of the predetermined buffer occupancy ranges is less than or equal to $2^n$.

30. The method of claim 21, wherein discharging the registered cells comprises regulating the discharge rate by providing one of a plurality of output enable signals to a measurement buffer output, wherein a different one of the plurality of output enable signals is provided for each of the predetermined buffer occupancy ranges.

31. The method of claim 21, wherein discharging the registered cells comprises regulating the discharge rate by providing an output enable signal proportional to the current buffer occupancy level to a measurement buffer output.

32. The method of claim 21, wherein discharging comprises increasing the discharge rate as the current occupancy level increases from a current buffer occupancy range to a higher one of the buffer occupancy ranges, and decreasing the discharge rate as the current occupancy level decreases from the current buffer occupancy range to a lower one of the buffer occupancy ranges.

33. The method of claim 21, wherein the each of the predetermined buffer occupancy ranges includes substantially the same number of cell locations, such that the time required to fill each of the buffer occupancy ranges increases exponentially as the current buffer occupancy range, and the cell priority value, increase.

34. The method of claim 21, wherein each of the predetermined buffer occupancy ranges includes an exponentially larger number of cell locations than a preceding buffer occupancy range, such that the time required to fill each of the buffer occupancy ranges is substantially the same as the time required to fill other ones of the buffer occupancy ranges.

35. A system for adjusting a transmission rate of information cells transmitted over a network connection, comprising:

a source unit that transmits the information cells to the network connection;

a cell transmission measurement device coupled to the source unit to register an occurrence of each information cell transmission to provide a quantitative cell transmission level;

a detector that detects the cell transmission level of the cell transmission measurement device, the detector producing a cell level signal indicative of a current quantitative cell transmission level of the cell transmission measurement device;

an output enable circuit, coupled to the detector to control a decrementing rate of the quantitative cell transmission level from the cell transmission measurement device in response to the cell level signal; and an encoder that encodes a priority value in each of the information cells, being transmitted over the network connection, the priority value indicating a probability of information cell acceptance at a node of the network connection and having a magnitude that varies in response to the current quantitative cell transmission level of the cell transmission measurement device.

36. The system of claim 35, wherein the cell transmission measurement device is a buffer capable of storing a virtual cell upon the occurrence of each information cell transmission, and wherein an occupancy level of the buffer corresponds to the quantitative cell transmission level.

37. The system of claim 35, wherein the cell transmission measurement device and the output enable circuit collectively comprise a counter, wherein the quantitative cell transmission level corresponds to a counter value of the counter, and wherein the counter value is incremented upon the occurrence of each information cell transmission, and is decremented at a rate dictated by the cell level signal.

38. The system of claim 37, wherein the decrement rate of the counter value increases as the counter value increases.

39. The system of claim 38, wherein the encoder encodes a priority value in each of the information cells, wherein the priority value has a magnitude corresponding one of a predetermined plurality of ranges of the counter values.

40. The method of claim 21, wherein each of the predetermined buffer occupancy ranges includes a predetermined number of cell locations, and wherein the time required to fill each of the buffer occupancy ranges is dependent on the predetermined number of cell locations in each particular buffer occupancy range.

* * * * *